United States Patent
Kilian et al.

(10) Patent No.: US 12,082,222 B2
(45) Date of Patent: Sep. 3, 2024

(54) SIGNALING OF A MULTICAST MESSAGE IN NON-COORDINATED NETWORKS

(71) Applicants: Fraunhofer-Gesellschaft zur Foerderung der angewandten Forschung e.V., Munich (DE); Diehl Metering GmbH, Ansbach (DE)

(72) Inventors: Gerd Kilian, Erlangen (DE); Josef Bernhard, Erlangen (DE); Thomas Kauppert, Nuremberg (DE); Hristo Petkov, Nuremberg (DE); Johannes Wechsler, Erlangen (DE); Jakob Kneissl, Erlangen (DE); Raphael Mzyk, Kammerstein (DE); Klaus Gottschalk, Winkelhaid (DE); Dominik Soller, Erlangen (DE); Michael Schlicht, Erlangen (DE)

(73) Assignees: Fraunhofer-Gesellschaft zur Foerderung der angewandten Forschung e. V., Munich (DE); Diehl Metering GmbH, Ansbach (DE)

( * ) Notice: Subject to any disclaimer, the term of this patent is extended or adjusted under 35 U.S.C. 154(b) by 356 days.

(21) Appl. No.: 17/459,026

(22) Filed: Aug. 27, 2021

(65) Prior Publication Data
US 2021/0392619 A1    Dec. 16, 2021

Related U.S. Application Data

(63) Continuation of application No. PCT/EP2020/054977, filed on Feb. 26, 2020.

(30) Foreign Application Priority Data

Feb. 28, 2019 (DE) .......................... 102019202725.3

(51) Int. Cl.
 H04W 72/30    (2023.01)
 H04W 4/06     (2009.01)
 H04W 56/00    (2009.01)

(52) U.S. Cl.
 CPC ............. *H04W 72/30* (2023.01); *H04W 4/06* (2013.01); *H04W 56/0015* (2013.01)

(58) Field of Classification Search
 CPC ................... H04W 72/30; H04W 4/06; H04W 56/0015; H04W 40/248
 See application file for complete search history.

(56) References Cited

U.S. PATENT DOCUMENTS

2005/0070277 A1* 3/2005 Hu ........................ H04W 4/06
                                                          455/414.1
2006/0268774 A1   11/2006 Kangas et al.
(Continued)

FOREIGN PATENT DOCUMENTS

CN     102047699 A     5/2011
CN     103548391 A     1/2014
(Continued)

OTHER PUBLICATIONS

ETSI TS 103 357, "Short Range Devices; Low Throughput Networks (LTN); Protocols for radio interface A", Standard v1.1.1 (Jun. 2018), Jun. 2018, 113 pp.
(Continued)

*Primary Examiner* — Farid Seyedvosoghi
(74) *Attorney, Agent, or Firm* — Perkins Coie LLP; Michael A. Glenn

(57) ABSTRACT

Embodiments of the present invention provide a participant of a communication system, wherein the communication system communicates wirelessly in a frequency used by a plurality of communication systems, wherein the participant is configured to transmit data uncoordinatedly with respect
(Continued)

to other participants and/or a base station of the communication system, wherein the participant is configured to receive, temporally synchronized to a transmitted uplink data transfer to the base station of the communication system, a downlink data transfer from the base station, wherein the downlink data transfer includes signaling information, wherein the participant is configured to receive a point-to-multipoint data transfer from the base station on the basis of the signaling information.

20 Claims, 11 Drawing Sheets

(56) References Cited

U.S. PATENT DOCUMENTS

| | | | | |
|---|---|---|---|---|
| 2008/0045228 | A1* | 2/2008 | Zhang | H04L 1/0026 455/450 |
| 2010/0020731 | A1* | 1/2010 | Bourdeaut | H04W 72/30 370/281 |
| 2010/0040369 | A1* | 2/2010 | Zhao | H04Q 11/0067 398/58 |
| 2014/0092801 | A1 | 4/2014 | Kim et al. | |
| 2014/0176341 | A1 | 6/2014 | Bernhard et al. | |
| 2014/0308897 | A1* | 10/2014 | Toya | H04N 21/6408 455/41.2 |
| 2015/0139063 | A1* | 5/2015 | Zhang | H04L 12/1886 370/312 |
| 2017/0163331 | A1 | 6/2017 | Breiling et al. | |
| 2017/0164354 | A1* | 6/2017 | Yang | H04L 5/0055 |
| 2017/0195890 | A1 | 7/2017 | Chen et al. | |
| 2017/0310497 | A1 | 10/2017 | Kim et al. | |
| 2018/0054799 | A1 | 2/2018 | Starsinic et al. | |
| 2018/0092101 | A1 | 3/2018 | Xia et al. | |
| 2019/0349976 | A1* | 11/2019 | Rudolf | H04W 72/23 |
| 2020/0044687 | A1 | 2/2020 | Wechsler et al. | |

FOREIGN PATENT DOCUMENTS

| | | |
|---|---|---|
| CN | 106605438 A | 4/2017 |
| CN | 107078787 A | 8/2017 |
| DE | 102011082098 A1 | 3/2013 |
| DE | 102017206236 A1 | 10/2018 |
| EP | 1521394 A1 | 4/2005 |
| EP | 1657852 A1 | 5/2006 |
| EP | 2034621 A1 | 3/2009 |
| WO | 2009145688 A1 | 12/2009 |
| WO | 2012172325 A1 | 12/2012 |
| WO | 2017/105522 A1 | 6/2017 |
| WO | 2018/132668 A1 | 7/2018 |
| WO | 2018/167035 A1 | 9/2018 |

OTHER PUBLICATIONS

Kilian, G., et al., "Increasing Transmission Reliability for Telemetry Systems Using Telegram Splitting", IEEE Transactions on Communications, vol. 63, No. 3, pp. 949-961, Mar. 2015, 14 pp.

* cited by examiner

SIGNALING OF A MULTICAST MESSAGE IN NON-COORDINATED NETWORKS

CROSS-REFERENCES TO RELATED APPLICATIONS

This application is a continuation of copending International Application No. PCT/EP2020/054977, filed Feb. 26, 2020, which is incorporated herein by reference in its entirety, and additionally claims priority from German Application No. DE 10 2019 202 725.3, filed Feb. 28, 2019, which is incorporated herein by reference in its entirety.

Embodiments of the present invention relate to a wireless communication system with a multitude of uncoordinatedly transmitting participants, and in particular to the transfer of a multicast message (point-to-multipoint message) in such a communication system. Some embodiments relate to signaling of a multicast message in non-coordinated networks.

BACKGROUND OF THE INVENTION

In typical radio networks (or wireless communication systems), such as GSM (Global System for Mobile Communications), there is a coordinating instance that provides radio resources to participants of the radio network, as needed, which are exclusively available to the respective participant.

This can ensure that each participant may transfer its data in a radio resource that is reserved exclusively for it. This avoids interferences between the participants of a radio network and therefore maximizes the throughput.

In such radio networks, the coordination of the participants with respect to radio resources is performed usually by means of so-called beacons which the participants of the network listen to. With the signalization of the radio resources in these beacons, it is a requirement for all participants to receive and evaluate them so as to be able to subsequently receive or transmit data. Thus, a participant that rarely accesses the channel has a very high current consumption.

In contrast, another approach is a non-coordinated radio network in which the participants transfer their data to the receiver in a contention-based manner. Thus, a beacon that signals when and which participant is allowed to transmit on which frequency does not have to be received continuously. This reduces the current consumption of the participants since they only have to be activated as needed.

However, this method has the disadvantage that there may be interferences between the participants of the radio network. However, this disadvantage may be reduced by the use of "Telegram Splitting Multiple Access" (TSMA) [4], which allows obtaining throughputs similar to coordinated systems.

In "Telegram Splitting Multiple Access" (TSMA), the transfer of a message (data packet) is divided into a plurality of short sub-data packets (bursts) between each of which there are transfer-free time intervals of different lengths. In this case, the sub-data packets are distributed pseudo-randomly across time and available frequency channels, as is exemplarily shown in FIG. 1.

In detail, FIG. 1 shows, in a diagram, an occupancy of a frequency band of a TSMA-based communication system in the transfer of a data packet divided onto a plurality of sub-data packets 10, wherein the plurality of sub-data packets are distributed in time and frequency. In FIG. 1, the ordinate describes the frequency (frequency channels), and the abscissa describes the time. In other words, FIG. 1 shows the principle of the data transfer according to the TSMA method.

[1] showed that the TSMA method may achieve a larger capacity in the data transfer in contrast to the transfer of a data packet in a continuous block, i.e. without subdivision into sub-data packets 10. In order to achieve as large a system capacity as possible, as many different time and/or frequency hopping patterns as possible should be used [3]. The total number of the time and/or frequency hopping patterns should be finite, and should originate from an inventory of time and/or frequency hopping patterns known in advance.

The contention-based access to the channel at random points in time results in an asynchronous transfer, as is exemplarily shown in FIG. 2 for a communication system without TSMA.

In detail, FIG. 2 shows, in a diagram, an occupancy of a frequency band of a contention-based communication system in the transfer of several uplink messages 12 and several downlink messages 14. In FIG. 2, the abscissa describes the frequency, and the ordinate describes the time. In other words, FIG. 2 shows a schema of a transfer channel in a non-coordinated communication system.

In a non-coordinated communication system, there are usually several participants (e.g. terminal points) that communicate with a base station. In this case, the transfer of a message from a participant to the base station is the uplink, and the downlink takes place in the opposite direction.

For reasons of energy efficiency, the participants usually only turn on their transmission/reception module when they want to transmit a message. Thus, the reception of one of the downlink messages 14, as shown in FIG. 2, is not possible.

To solve this problem, [4] has defined that the participant waits for a specifically defined time after the emission of an uplink message to then open a reception window for a downlink message. Thus, the base station can transmit a downlink message to this participant at a certain point in time only.

Typically, the downlink to the participants employing the uncoordinated transfer is used for messages that are to be transferred to several participants, e.g. software updates or time-sync commands.

Due to the asynchronous network approach from [4] (contention-based access), the downlink message has to be separately shared with each participant. Particularly in large radio networks with many participants, this is a problem since, with a large number of participants, it would take a very long time until all participants have obtained the data.

In coordinated communication systems it is possible to signal in a beacon a point-to-multipoint message (multicast message) from the base station to the participants. All participants having received the beacon may subsequently also receive the corresponding resources of the multicast message.

SUMMARY

An embodiment may have a terminal point of a communication system, wherein the terminal point is configured to transmit an uplink data transfer to a base station of the communication system, wherein a point in time of transmission of the uplink data transfer is determined by the terminal point itself, wherein the terminal point is configured to receive, after a specified time after the uplink data transfer, a downlink data transfer from the base station in a specified time interval, wherein the downlink data transfer comprises signaling information, wherein the terminal point is configured to receive a point-to-multipoint data transfer from the base station on the basis of the signaling information.

Another embodiment may have a base station of a communication system, wherein the base station is configured to receive an uplink data transfer from a terminal point of the communication system, wherein a point in time of transmission of the uplink data transfer is determined by the terminal point itself, wherein the base station is configured to transmit, after a specified time after the uplink data transfer, a downlink data transfer to the terminal point in a specified time interval, wherein the downlink data transfer comprises signaling information, wherein the signaling information signals a subsequent point-to-multipoint data transfer or a further data transfer preceding the point-to-multipoint data transfer, wherein the base station is configured to transmit the point-to-multipoint data transfer according to the signaling information to a plurality of terminal points of the communication system, wherein the terminal point is part of the plurality of terminal points.

Another embodiment may have a method for operating a terminal point of a communication system, the method having the steps of: transmitting an uplink data transfer to a base station of the communication system, wherein a point in time of transmission of the uplink data transfer is determined by the terminal point itself, receiving, after a specified time after the uplink data transfer, a downlink data transfer from the base station in a specified time interval, wherein the downlink data transfer comprises signaling information, receiving a point-to-multipoint data transfer from the base station on the basis of the signaling information.

Another embodiment may have a method for operating a base station of a communication system, the method having the steps of: receiving an uplink data transfer from a terminal point of the communication system, wherein a point in time of transmission of the uplink data transfer is determined by the terminal point itself, transmitting, after a specified time after the uplink data transfer, a downlink data transfer to the terminal point in a specified time interval, wherein the downlink data transfer comprises signaling information, wherein the signaling information signals a subsequent point-to-multipoint data transfer or a further data transfer preceding the point-to-multipoint data transfer, transmitting the point-to-multipoint data transfer according to the signaling information, to a plurality of terminal points of the communication system, wherein the terminal point is part of the plurality of terminal points.

Another embodiment may have a non-transitory digital storage medium having a computer program stored thereon to perform the method for operating a terminal point of a communication system, the method having the steps of: transmitting an uplink data transfer to a base station of the communication system, wherein a point in time of transmission of the uplink data transfer is determined by the terminal point itself, receiving, after a specified time after the uplink data transfer, a downlink data transfer from the base station in a specified time interval, wherein the downlink data transfer comprises signaling information, receiving a point-to-multipoint data transfer from the base station on the basis of the signaling information, when said computer program is run by a computer.

Another embodiment may have a non-transitory digital storage medium having a computer program stored thereon to perform the method for operating a base station of a communication system, the method having the steps of: receiving an uplink data transfer from a terminal point of the communication system, wherein a point in time of transmission of the uplink data transfer is determined by the terminal point itself, transmitting, after a specified time after the uplink data transfer, a downlink data transfer to the terminal point in a specified time interval, wherein the downlink data transfer comprises signaling information, wherein the signaling information signals a subsequent point-to-multipoint data transfer or a further data transfer preceding the point-to-multipoint data transfer, transmitting the point-to-multipoint data transfer according to the signaling information, to a plurality of terminal points of the communication system, wherein the terminal point is part of the plurality of terminal points, when said computer program is run by a computer.

Embodiments provide a participant [e.g. a terminal point] of a communication system, [wherein the communication system communicates wirelessly in a frequency band [e.g. the ISM band] used by a plurality of [e.g. mutually uncoordinated] communication systems], wherein the participant is configured to transmit data uncoordinatedly with respect to other participants and/or a base station of the communication system, wherein the participant is configured to receive, temporally synchronized to a transmitted uplink data transfer to the base station of the communication system, a downlink data transfer from the base station, wherein the downlink data transfer comprises signaling information, wherein the participant is configured to receive a point-to-multipoint data transfer [e.g. a multicast data transfer] from the base station on the basis of the signaling information.

In embodiments, the signaling information may comprise information about a point in time of the point-to-multipoint data transfer.

For example, the information about the point in time may be an absolute point in time, a relative point in time [e.g. a defined time span between the downlink data transfer and the point-to-multipoint data transfer], or information from which the absolute or relative points in time may be derived, such as a number of clock cycles of an oscillator of the participant.

In embodiments, the signaling information may further comprise information about a frequency channel [e.g. of the frequency band used by the communication system] of the point-to-multipoint data transfer.

For example, the information about the frequency channel may be an absolute frequency channel or a relative frequency channel [e.g. a distance between a frequency channel of the downlink data transfer and a frequency channel of the point-to-multipoint data transfer].

In embodiments, the point-to-multipoint data transfer may comprise a plurality of sub-data packets transferred distributed in time and/or frequency according to a time and/or frequency hopping pattern, wherein the signaling information further comprises information about the time and/or frequency hopping pattern.

For example, the point-to-multipoint data transfer may be a telegram splitting-based data transfer. In a telegram splitting-based data transfer, the data to be transferred [e.g. [encoded] payload data of the physical layer] is divided onto a plurality of sub-data packets so that the plurality of sub-data packets each comprises only a part of the data to be transferred, wherein the plurality of sub-data packets is transferred not continuously, but distributed in time and/or frequency according to a time and/or frequency hopping pattern.

In embodiments, the information about the point in time of the point-to-multipoint data transfer may comprise a defined [e.g. desired or intentional] inaccuracy that is at least large enough so that a receiver-side synchronization to the point-to-multipoint data transfer is required for receiving the point-to-multipoint data transfer, wherein the participant is configured to perform a synchronization to the point-to-multipoint data transfer so as to receive the point-to-multipoint data transfer.

In embodiments, the defined inaccuracy may be in the range of 1 to 10,000 symbol durations.

In embodiments, the defined inaccuracy may be subject to non-linear scaling [e.g. a logarithmic scaling] as a function of a temporal interval to the point-to-multipoint data transfer so that the inaccuracy is larger as the interval to the point-to-multipoint data transfer increases.

In embodiments, the downlink data transfer may further comprise clock generator correction information [e.g. a quartz offset in ppm is used for a timer and a frequency generator] for correcting a clock deviation of a clock generator of the participant, wherein the participant is configured to correct a clock deviation of the clock generator on the basis of the clock generator correction information.

In embodiments, the uplink data transfer may be a first uplink data transfer, wherein the downlink data transfer may be a first downlink data transfer, wherein the signaling information is first signaling information, wherein the first signaling information signals a period of time or point in time [e.g. a rough point in time] for a second uplink data transfer [e.g. following the first uplink data transfer], wherein the participant is configured to transmit the second uplink data transfer to the base station in the signaled period of time and to receive, temporally synchronized to the second uplink data transfer, a second downlink data transfer from the base station, wherein the second downlink data transfer comprises second signaling information, wherein the participant is configured to receive the point-to-multipoint data transfer [e.g. the multicast data transfer] on the basis of the second signaling information.

In embodiments, the second signaling information may comprise information about a point in time of the point-to-multipoint data transfer.

In embodiments, the second signaling information may further comprise information about a frequency channel [e.g. of the frequency band used by the communication system] of the point-to-multipoint data transfer.

In embodiments, the point-to-multipoint data transfer may comprise a plurality of sub-data packets transferred distributed in time and/or frequency according to a time and/or frequency hopping pattern, wherein the second signaling information further comprises information about the time and/or frequency hopping pattern.

In embodiments, the participant may be configured, if the second downlink data transfer could not be received successfully [e.g. if the second downlink data transfer did not occur or was interrupted], to transmit a third uplink data transfer to the base station and to receive, temporally synchronized to the third uplink data transfer, a third downlink data transfer from the base station, wherein the third downlink data transfer comprises third signaling information, wherein the participant is configured to receive the point-to-multipoint data transfer [e.g. the multicast data transfer] on the basis of third signaling information.

In embodiments, the first downlink data transfer or the second downlink data transfer may further comprise clock generator correction information describing a clock deviation of a clock generator of the participant with respect to a reference clock, wherein the participant is configured to receive the point-to-multipoint data transfer by using the clock generator correction information [e.g. to correct a clock deviation of the clock generator on the basis of the clock generator correction information for receiving the point-to-multipoint data transfer].

In embodiments, the uplink data transfer may be a first uplink data transfer, wherein the downlink data transfer is a first downlink data transfer, wherein the signaling information is first signaling information, wherein the first signaling information comprises information about a rough point in time of the point-to-multipoint data transfer, [e.g. wherein the information about the rough point in time of the point-to-multipoint data transfer is too inaccurate for a reception of the point-to-multipoint data transfer], wherein the participant is configured to transmit a fourth uplink data transfer to the base station before the rough point in time of the point-to-multipoint data transfer and to receive, temporally synchronized to the fourth uplink data transfer, a fourth downlink data transfer from the base station, wherein the fourth downlink data transfer comprises fourth signaling information, wherein the participant is configured to receive the point-to-multipoint data transfer [e.g. the multicast data transfer] on the basis of the fourth signaling information.

In embodiments, the fourth signaling information may comprise information about a point in time of the point-to-multipoint data transfer.

In embodiments, the fourth signaling information may further comprise information about a frequency channel [e.g. of the frequency band used by the communication system] of the point-to-multipoint data transfer.

In embodiments, the point-to-multipoint data transfer may comprise a plurality of sub-data packets transferred distributed in time and/or frequency according to a time and/or frequency hopping pattern, wherein the fourth signaling information may further comprise information about the time and/or frequency hopping pattern.

In embodiments, the first downlink data transfer or the fourth downlink data transfer may further comprise clock generator correction information for correcting a clock deviation of a clock generator of the participant, wherein the participant is configured to correct a clock deviation of the clock generator on the basis of the clock generator correction information.

In embodiments, the signaling information may be first signaling information, wherein the first signaling information comprises information about a point in time of a support beacon, wherein the participant is configured to receive the support beacon on the basis of the first signaling information, wherein the support beacon comprises fifth signaling information, wherein the participant is configured to receive the point-to-multipoint data transfer [e.g. the multicast data transfer] on the basis of the fifth signaling information.

In embodiments, the first signaling information may further comprise information about a frequency channel [e.g. of the frequency band used by the communication system] or a frequency offset of the support beacon.

In embodiments, the fifth signaling information may comprise information about a point in time of the point-to-multipoint data transfer.

In embodiments, the fifth signaling information may further comprise information about a frequency channel [e.g. of the frequency band used by the communication system] of the point-to-multipoint data transfer.

In embodiments, the point-to-multipoint data transfer may comprise a plurality of sub-data packets transferred distributed in time and/or frequency according to a time and/or frequency hopping pattern, wherein the fifth signaling information further comprises information about the time and/or frequency hopping pattern.

In embodiments, the downlink data transfer or the support beacon may further comprise clock generator correction information for correcting a clock deviation of a clock generator of the participant, wherein the participant is configured to correct a clock deviation of the clock generator on the basis of the clock generator correction information.

In embodiments, the participant may be configured to transmit data asynchronously to other participants and/or the base station of the communication system.

For example, the participant may be configured to transmit the uplink data transfer asynchronously to the base station.

In embodiments, the participant may be configured to transmit the uplink data transfer to the base station at a random or pseudo-random point in time.

In embodiments, the uplink data transfer may comprise a plurality of sub-data packets transferred distributed in time and/or frequency according to a time and/or frequency hopping pattern.

For example, the uplink data transfer may be a telegram splitting-base data transfer. In a telegram splitting-base data transfer, the data to be transferred [e.g. (encoded) payload data of the physical layer] is divided onto a plurality of sub-data packets so that the plurality of sub-data packets each comprises only a part of the data to be transferred, wherein the plurality of sub-data packets is transferred not continuously, but distributed in time and/or frequency according to a time and/or frequency hopping pattern.

In embodiments, the downlink data transfer may comprise a plurality of sub-data packets transferred distributed in time and/or frequency according to a time and/or frequency hopping pattern.

For example, the downlink data transfer may be a telegram splitting-base data transfer. In a telegram splitting-base data transfer, the data to be transferred [e.g. (encoded) payload data of the physical layer] is divided onto a plurality of sub-data packets so that the plurality of sub-data packets each comprises only a part of the data to be transferred, wherein the plurality of sub-data packets is transferred not continuously, but distributed in time and/or frequency according to a time and/or frequency hopping pattern.

In embodiments, the participant may be a sensor node or actuator node.

In embodiments, the participant may be battery-operated.

In embodiments, the participant may comprise an energy harvesting element for generating electric energy.

Further embodiments provide a base station of a communication system [wherein the communication system communicates wirelessly in a frequency band [e.g. the ISM band] used by a plurality of [e.g. mutually uncoordinated] communication systems], wherein the base station is configured to receive an uplink data transfer from a participant of the communication system, wherein the uplink data transfer is uncoordinated, wherein the base station is configured to transmit, temporally synchronized to the received uplink data transfer of the participant, a downlink data transfer to the participant, wherein the downlink data transfer comprises signaling information, wherein the signaling information signals a subsequent point-to-multipoint data transfer or a further data transfer preceding the point-to-multipoint data transfer, wherein the base station is configured to transmit [e.g. to a plurality of participants of the communication system, wherein the participant is part of the plurality of participants] the point-to-multipoint data transfer according to the signaling information.

In embodiments, the signaling information may comprise information about a point in time of the point-to-multipoint data transfer.

For example, the information about the point in time may be an absolute point in time, a relative point in time [e.g. a defined time span between the downlink data transfer and the point-to-multipoint data transfer], or information from which the absolute or relative points in time may be derived, such as a number of clock cycles of an oscillator of the participant.

In embodiments, the signaling information may further comprise information about a frequency channel [e.g. of the frequency band used by the communication system] of the point-to-multipoint data transfer.

For example, the information about the frequency channel may be an absolute frequency channel or a relative frequency channel [e.g. a distance between a frequency channel of the downlink data transfer and a frequency channel of the point-to-multipoint data transfer].

In embodiments, the point-to-multipoint data transfer may comprise a plurality of sub-data packets transferred distributed in time and/or frequency according to a time and/or frequency hopping pattern, wherein the signaling information further comprises information about the time and/or frequency hopping pattern.

For example, the point-to-multipoint data transfer may be a telegram splitting-based data transfer. In a telegram splitting-based data transfer, the data to be transferred [e.g. [encoded] payload data of the physical layer] is divided onto a plurality of sub-data packets so that the plurality of sub-data packets each comprises only a part of the data to be transferred, wherein the plurality of sub-data packets is transferred not continuously, but distributed in time and/or frequency according to a time and/or frequency hopping pattern.

In embodiments, the information about the point in time of the point-to-multipoint data transfer may comprise a defined [e.g. desired or intentional] inaccuracy that is at least large enough so that a receiver-side synchronization to the point-to-multipoint data transfer is required for receiving the point-to-multipoint data transfer.

In embodiments, the defined inaccuracy may be in the range of 1 to 10,000 symbol durations.

In embodiments, the defined inaccuracy may be subject to non-linear scaling as a function of a temporal interval to the point-to-multipoint data transfer so that the inaccuracy is larger as the interval to the point-to-multipoint data transfer increases.

In embodiments, the base station may be configured to determine a clock deviation of a clock generator of the participant on the basis of the uplink data transfer of the participant, wherein the base station is configured to provide the downlink data transfer with clock generator correction information for correcting the clock deviation of the clock generator of the participant.

In embodiments, the base station may be configured to determine a clock deviation of a clock generator of the participant on the basis of the uplink data transfer to the participant, wherein the information about the point in time of the point-to-multipoint data transfer which the signaling information comprises considers the clock deviation on the clock generator of the participant [e.g. such that the clock deviation of the clock generator is compensated], and/or wherein the information about the frequency channel of the point-to-multipoint data transfer which the signaling information comprises considers the clock deviation of the clock generator of the participant [e.g. such that the clock deviation of the clock generator is compensated].

In embodiments, the uplink data transfer may be a first uplink data transfer, wherein the downlink data transfer is a first downlink data transfer, wherein the signaling information is first signaling information, wherein the first signaling information signals a period of time or point in time [e.g. a rough point in time] for a second uplink data transfer [e.g. following the first uplink data transfer], wherein the base station is configured to receive the second uplink data transfer from the participant in the signaled period of time and to transmit, temporally synchronized to the second uplink data transfer, a second downlink data transfer to the participant, wherein the second downlink data transfer comprises second signaling information, wherein the second signaling information signals the subsequent point-to-multipoint data transfer [e.g. wherein the second uplink data transfer and/or the second downlink data transfer is the further data transfer], wherein the base station is configured to transmit [e.g. to a plurality of participants of the communication system, wherein the participant is part of the plurality of participants] the point-to-multipoint data transfer according to the second signaling information.

In embodiments, the second signaling information may comprise information about a point in time of the point-to-multipoint data transfer.

In embodiments, the second signaling information may further comprise information about a frequency channel [e.g. of the frequency band used by the communication system] of the point-to-multipoint data transfer.

In embodiments, the point-to-multipoint data transfer may comprise a plurality of sub-data packets transferred distributed in time and/or frequency according to a time and/or frequency hopping pattern, wherein the second signaling information further comprises information about the time and/or frequency hopping pattern.

In embodiments, the base station may be configured to determine a clock deviation of a clock generator of the participant on the basis of the second uplink data transfer of the participant, wherein the base station is configured to provide the second downlink data transfer with clock generator correction information for correcting the clock deviation of the clock generator of the participant.

In embodiments, the base station may be configured to determine a clock deviation of clock generator of the participant on the basis of the first or second uplink data transfers of the participant, wherein the information about the point in time of the point-to-multipoint data transfer which the second signaling information comprises considers the clock deviation of the clock generator of the participant [e.g. such that the clock deviation of the clock generator is compensated].

In embodiments, the uplink data transfer may be a first uplink data transfer, wherein the downlink data transfer is a first downlink data transfer, wherein the signaling information is first signaling information, wherein the first signaling information comprises information about a rough point in time of the point-to-multipoint data transfer [e.g. wherein the information about the rough point in time of the point-to-multipoint data transfer is too inaccurate for a reception of the point-to-multipoint data transfer], wherein the base station is configured to receive a fourth uplink data transfer from the participant before the rough point in time of the point-to-multipoint data transfer and to transmit, temporally synchronized to the fourth uplink data transfer, a fourth downlink data transfer to the participant, wherein the fourth downlink data transfer comprises fourth signaling information, wherein the fourth signaling information signals the subsequent point-to-multipoint data transfer, [e.g. wherein the fourth uplink data transfer and/or the fourth downlink data transfer is the further data transfer], wherein the base station is configured to transmit [e.g. to a plurality of participants of the communication system, wherein the participant is part of the plurality of participants] the point-to-multipoint data transfer according to the fourth signaling information.

In embodiments, the fourth signaling information may comprise information about a point in time of the point-to-multipoint data transfer.

In embodiments, the fourth signaling information may further comprise information about a frequency channel [e.g. of the frequency band used by the communication system] of the point-to-multipoint data transfer.

In embodiments, the point-to-multipoint data transfer may comprise a plurality of sub-data packets transferred distributed in time and/or frequency according to a time and/or frequency hopping pattern, wherein the fourth signaling information may further comprise information about the time and/or frequency hopping pattern.

In embodiments, the base station may be configured to determine a clock deviation of a clock generator of the participant on the basis of the fourth uplink data transfer of the participant, wherein the base station is configured to provide the fourth downlink data transfer with clock generator correction information for correcting the clock deviation of the clock generator of the participant.

In embodiments, the base station may be configured to determine a clock deviation of a clock generator of the participant on the basis of the fourth uplink data transfer of the participant, wherein the information about the point in time of the point-to-multipoint data transfer which the fourth signaling information comprises considers the clock deviation on the clock generator of the participant [e.g. such that the clock deviation of the clock generator is compensated], and/or wherein the information about the frequency channel of the point-to-multipoint data transfer which the fourth signaling information comprises considers the clock deviation of the clock generator of the participant [e.g. such that the clock deviation of the clock generator is compensated].

In embodiments, the signaling information may be first signaling information, wherein the first signaling information comprises information about a point in time of a support beacon, wherein the base station is configured to transmit [e.g. to a plurality of participants of the communication system, wherein the participant is part of the plurality of participants] the support beacon according to the first signaling information, wherein the support beacon comprises fifth signaling information, wherein the fifth signaling information signals the subsequent point-to-multipoint data transfer [e.g. wherein the support beacon is the further data transfer].

In embodiments, the first signaling information may further comprise information about a frequency channel [e.g. of the frequency band used by the communication system] of the support beacon.

In embodiments, the fifth signaling information may comprise information about a point in time of the point-to-multipoint data transfer.

In embodiments, the fifth signaling information may further comprise information about a frequency channel [e.g. of the frequency band used by the communication system] of the point-to-multipoint data transfer.

In embodiments, the point-to-multipoint data transfer may comprise a plurality of sub-data packets transferred distributed in time and/or frequency according to a time and/or frequency hopping pattern, wherein the fifth signaling information further comprises information about the time and/or frequency hopping pattern.

In embodiments, the base station may be configured to determine a clock deviation of a clock generator of the participant on the basis of the uplink data transfer of the participant, wherein the base station is configured to provide the downlink data transfer or the support beacon with clock generator correction information for correcting the clock deviation of the clock generator of the participant.

In embodiments, the base station may be configured to determine a clock deviation of a clock generator of the participant on the basis of the uplink data transfer of the participant, wherein the information about the point in time of the point-to-multipoint data transfer which the fifth signaling information comprises considers the clock deviation of the clock generator of the participant [e.g. such that the clock deviation of the clock generator is compensated].

Further embodiments provide a method for operating a participant of a communication system. The method includes a step of transmitting an uplink data transfer to a base station of the communication system, wherein the uplink data transfer is uncoordinated. Furthermore, the method includes a step of receiving, temporally synchronized to the uplink data transfer, a downlink data transfer from the base station, wherein the downlink data transfer comprises signaling information. Furthermore, the method includes a step of receiving a point-to-multipoint data transfer [e.g. a multicast data transfer] from the base station on the basis of the signaling information.

Further embodiments provide a method for operating a base station of a communication system. The method includes a step of receiving an uplink data transfer from a participant of the communication system, wherein the uplink data transfer is uncoordinated. Furthermore, the method includes a step of transmitting, temporally synchronized to the uplink data transfer, a downlink data transfer to the participant, wherein the downlink data transfer comprises signaling information, wherein the signaling information signals a subsequent point-to-multipoint data transfer or a further data transfer preceding the point-to-multipoint data transfer. Furthermore, the method includes a step of transmitting [e.g. to a plurality of participants of the communication system, wherein the participant is part of the plurality of participants] the point-to-multipoint data transfer according to the signaling information.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
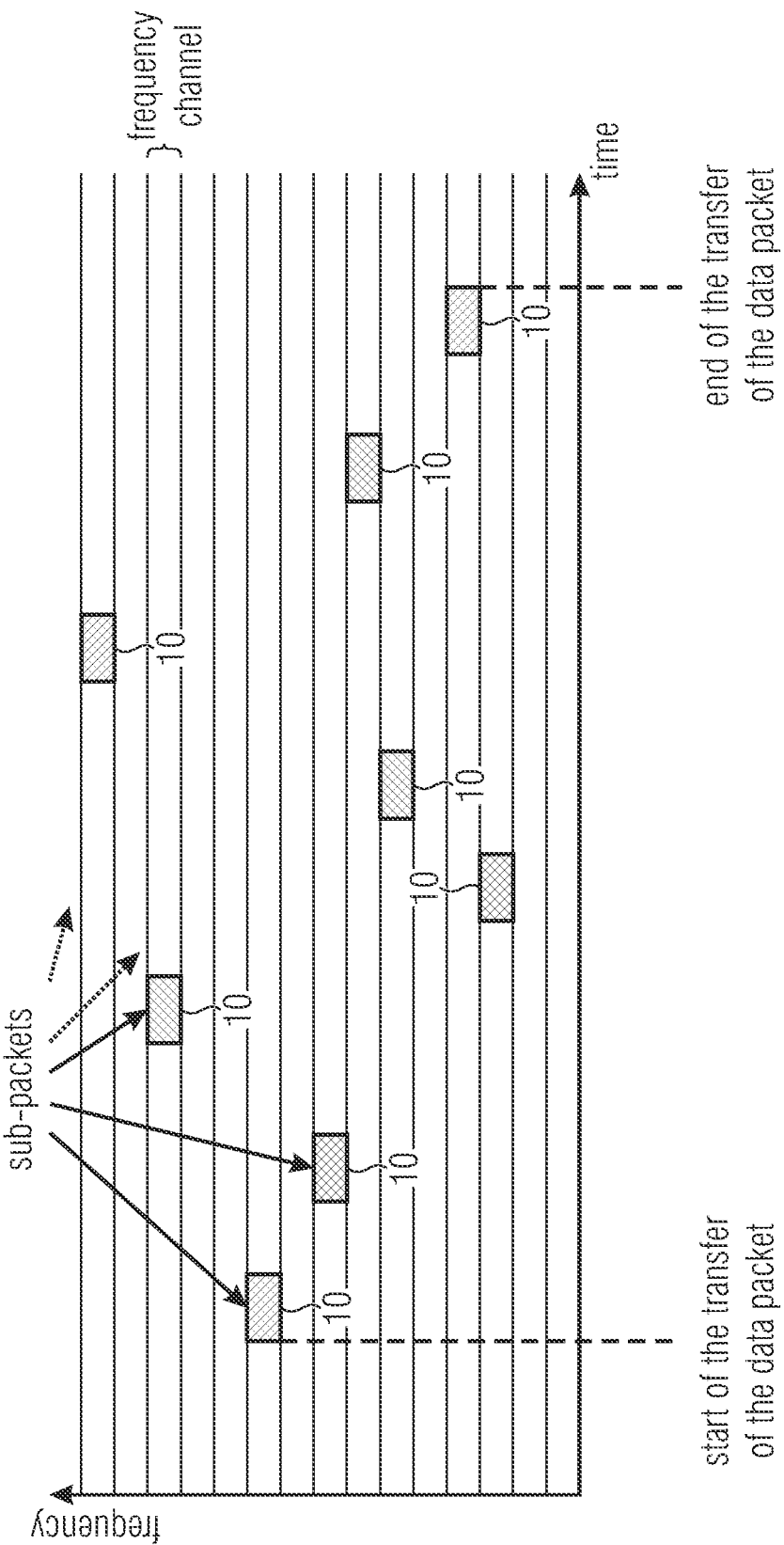
FIG. 1 shows, in a diagram, an occupancy of a frequency band of a TSMA-based communication system in the transfer of a data packet divided onto a plurality of sub-data packets, wherein the plurality of sub-data packets are distributed in time and frequency.
Figure 2:
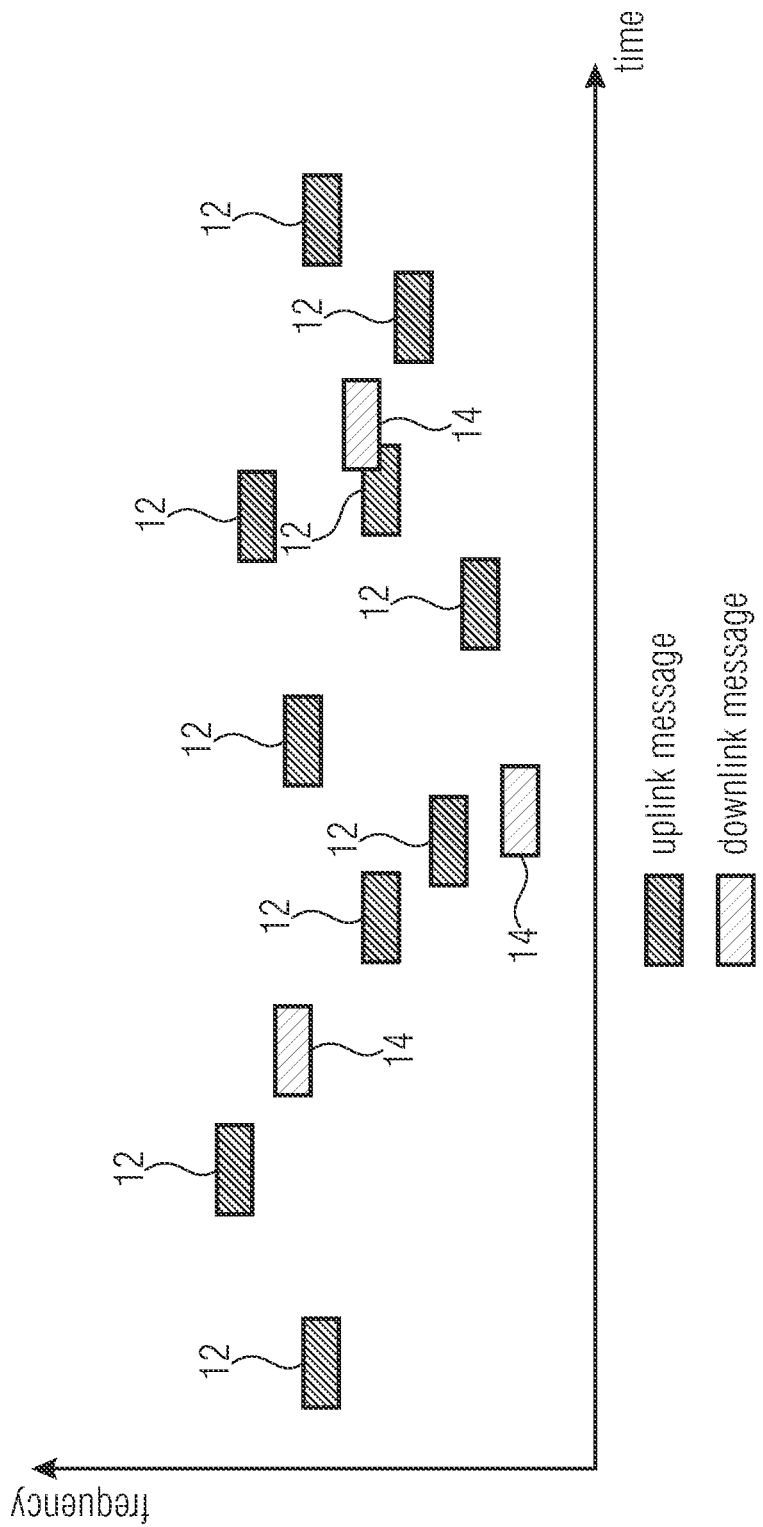
FIG. 2 shows, in a diagram, an occupancy of a frequency band of a contention-based communication system in the transfer of several uplink messages and several downlink messages.

In the subsequent description of the embodiments of the present invention, the same elements or elements having the same effect are provided in the drawings with the same reference numerals so that their description is interchangeable.

Figure 3:
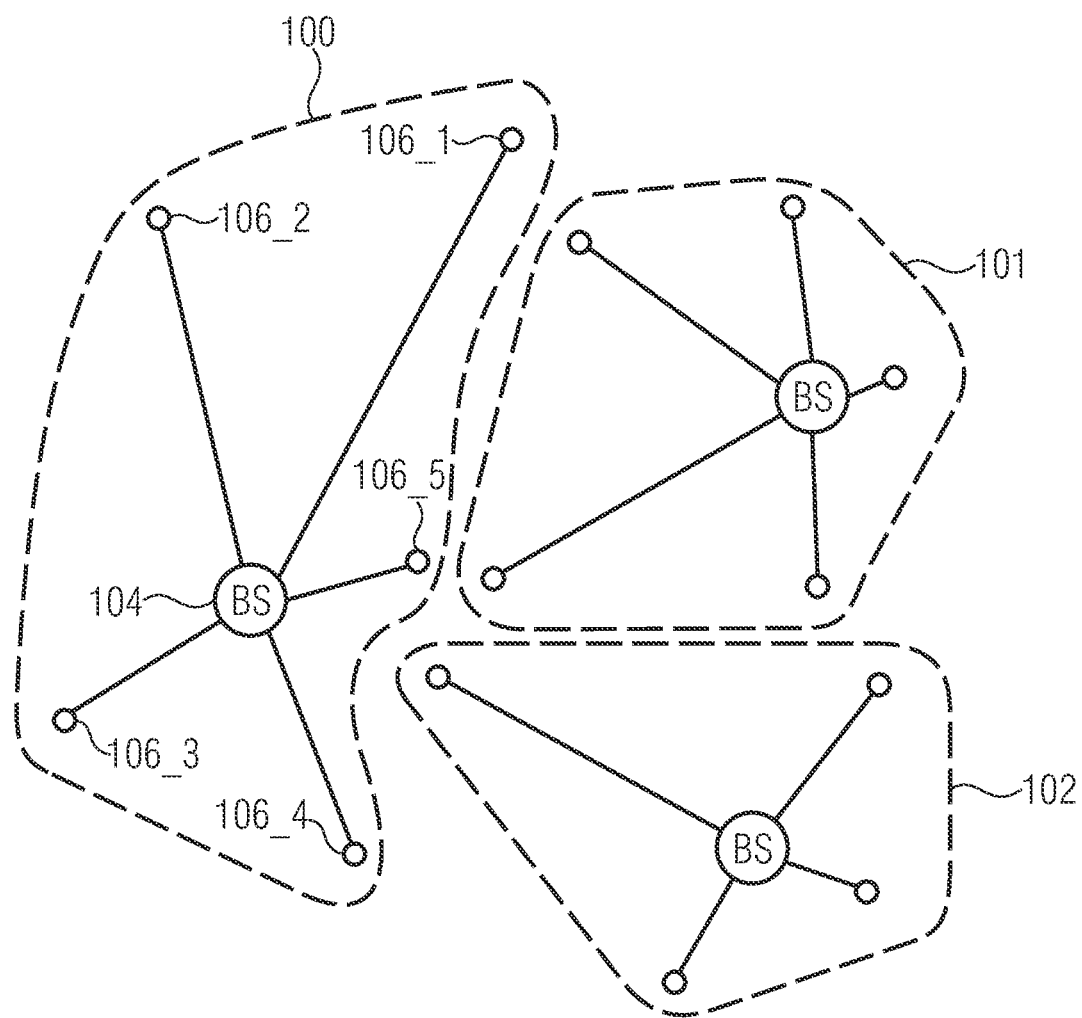
FIG. 3 shows a schematic view of a communication system with one base station and one or several participants as well as two other communication systems, according to an embodiment of the present invention.
Figure 4:
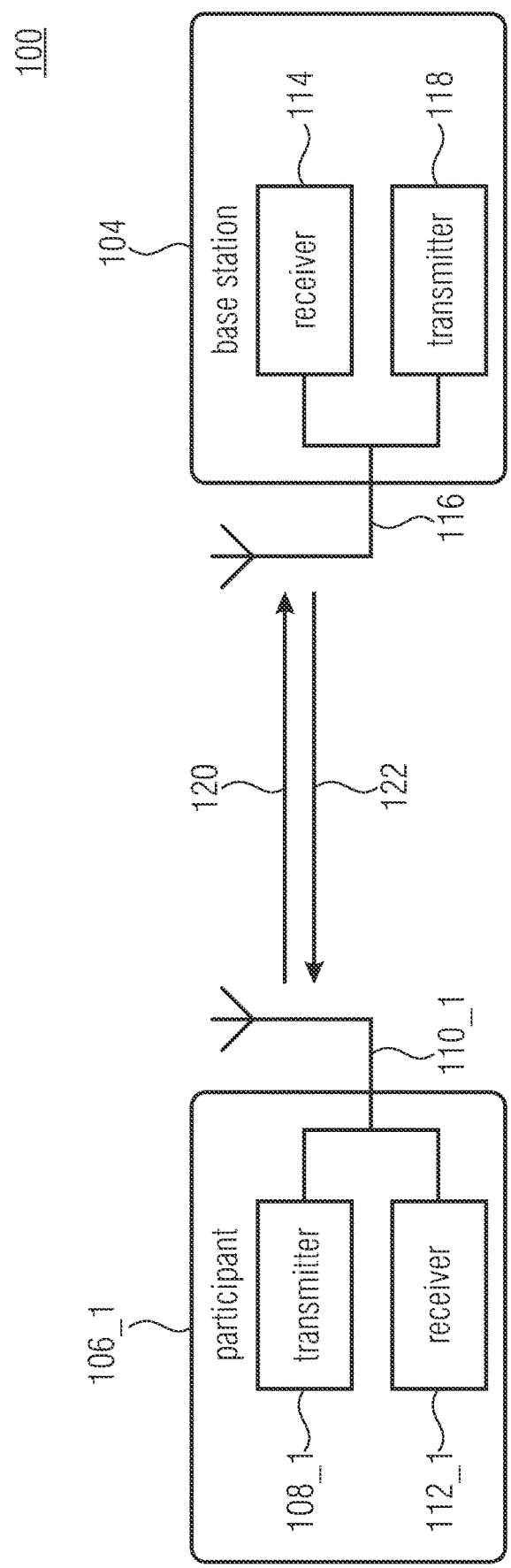
FIG. 4 shows a schematic block circuit diagram of the base station and one of the participants of the communication system shown in FIG. 3, according to an embodiment of the present invention.

Before describing in detail embodiments of a participant (e.g. a terminal point) and a base station, the underlying communication system in which the participant and/or the base station may be used is described in more detail on the basis of FIGS. 3 and 4.

FIG. 3 shows a schematic view of a communication system 100 and two other communication systems 101 and 102, according to an embodiment of the present invention.

The communication system 100 may comprise a base station 104 (or optionally several base stations) and one or several participants (e.g. terminal points) 106_1-106_$n$, wherein n is a natural number larger than one. In the embodiment shown in FIG. 3, for illustration purposes, the communication system 100 comprises five participants 106_1-106_5, however, the communication system 104_1 may also comprise 1, 10, 100, 1,000, 10,000 or even 100,000 participants.

The communication system 100 may be configured to communicate wirelessly in a frequency band (e.g. a license-free and/or permission-free frequency band such as the ISM band) used for communication by a plurality of mutually uncoordinated communication systems, as is exemplarily indicated in FIG. 3 by the other communication systems 101 and 102.

The frequency band used by the communication system 100 may have a significantly larger bandwidth (e.g. at least by the factor 5 (or 10)) than reception filters of the receivers (or transceivers) of the participant 106_1-106_n.

The participants 106_1-106_n of the communication system 100 may be configured to transmit data uncoordinatedly (e.g. and asynchronously) with respect to other participants and/or the base station 104 of the communication system 100. For example, the participants 106_1-106_n may be configured to transmit data in specified rough intervals (e.g. hourly, daily, weekly, semi-annually, annually, etc.) or as a reaction to an external event (e.g. a deviation of a sensor value from a target value). In this case, the respective participant may itself determine the exact point in time of the transmission and/or the exact frequency, or the exact frequency channel of the frequency band, for the transfer of the data. In this case, the respective participant transmits the data regardless of whether another participant and/or the base station 104 transfers data at the same point in time or with a temporal overlap and/or on the same frequency, or on the same frequency channel of the frequency band.

In this case, the transfer of data (e.g. a data packet) from one of the participants 106_1-106_n, e.g. from the participant 106_1, to the base station 104 is referred to as the uplink data transfer, whereas the transfer of data from the base station 104 to one of the participants 106_1-106_n, e.g. to the participant 106_1, is referred to as the downlink data transfer. Accordingly, the uplink data transfer refers to (or includes) the transfer of an uplink data packet (or an uplink message) from the respective participant to the base station 104, whereas the downlink data transfer refers to (or includes) the transfer of a downlink data packet (or a downlink message) from the base station 104 to the respective participant.

Since the uplink data transfer of the respective participant 106_1-106_n takes place uncoordinatedly and the transmission/reception unit (transceiver) of the respective participant 106_1-106_n is usually only activated for the data transfer, the downlink data transfer to the respective participant takes place temporally synchronized to the uplink data transfer, i.e. after a specified time and/or frequency after the uplink data transfer, the respective participant activates its transmission/reception unit (transceiver) for a specified time interval (reception window) so as to receive the downlink data transfer that is transmitted exactly within this time interval by the base station 104 as a response to (e.g. as a reaction to) the uplink data transfer. Optionally, the downlink data transfer to the respective participant may also be synchronized in frequency to the respective uplink data transfer, e.g. it may be on the same frequency (in the same frequency channel) or with a specified frequency interval.

This has the advantage that the participants 106_1-106_n have to activate their transmission/reception units (transceivers) only for the respective data transfer (uplink data transfer and/or downlink data transfer) (e.g. in a normal operation mode), while their transmission/reception units may be deactivated for the remaining time (e.g. placed into an energy-saving mode) so as to save energy. In particular, this is of advantage if the respective participant has only limited energy resources, e.g. because it is battery-operated or gathers its energy from the surrounding area by means of an energy-harvesting element.

For example, the participants 106_1-106_n of the communication system 100 may be actuator nodes and/or sensor nodes, such as heating meters, motion detectors, smoke detectors, etc.

Optionally, the base station 104 and the participants 106_1-106_n of the communication system 100 may be configured to transfer data on the basis of the telegram splitting method. In this case, on the data transmitter side, the data to be transferred, e.g. a telegram or data packet (e.g. of the physical layer in the OSI model) such as an uplink data packet or a downlink data packet, is divided onto a plurality of sub-data packets (or partial data packets), and the sub-data packets are not transferred continuously, but distributed in time and/or in frequency according to a time and/or frequency hopping pattern, wherein the sub-data packets are merged (or combined) on the data receiver side so as to obtain the data packet. In this case, each of the sub-data packets only contains a part of the data packet. Furthermore, the data packet may be encoded (channel-encoded or error protection-encoded) so that not all of the sub-data packets are required to faultlessly decode the data packet, but only a part of the sub-data packets is required.

As previously mentioned, the distribution of the plurality of sub-data packets in time and/or frequency may be carried out according to a time and/or frequency hopping pattern.

A time hopping pattern may indicate a sequence of points in time of transmission or transmission time intervals with which the sub-data packets are transmitted. For example, a first sub-data packet may be transmitted at a first point in time of transmission (or in a first transmission time slot), and a second sub-data packet may be transmitted at a second point in time of transmission (or in a second transmission time slot), wherein the first point in time of transmission and second point in time of transmission are different. In this case, the time hopping pattern may define (or specify, or indicate) the first point in time of transmission and the second point in time of transmission. Alternatively, the time hopping pattern may indicate the first point in time of transmission and a temporal interval between the first point in time of transmission and the second point in time of transmission. Obviously, the time hopping pattern may also only indicate the temporal interval between the first point in time of transmission and the second point in time of transmission. Between the sub-data packets, there may be transmission pauses in which no transmission takes place. The sub-data packets may also temporally overlap (coincide).

A frequency hopping pattern may indicate a sequence of transmission frequencies or transmission frequency hops with which the sub-data packets are transmitted. For example, a first sub-data packet may be transmitted with a first transmission frequency (or in a first frequency channel) and a second sub-data packet may be transmitted with a second transmission frequency (or in a second frequency channel), wherein the first transmission frequency and the second transmission frequency are different. In this case, the frequency hopping pattern may define (or specify, or indicate) the first transmission frequency and the second transmission frequency. Alternatively, the frequency hopping pattern may indicate the first transmission frequency and a frequency interval (transmission frequency hop) between the first transmission frequency and the second transmission frequency. Obviously, the frequency hopping pattern may also only indicate the frequency interval (transmission frequency hop) between the first transmission frequency and the second transmission frequency.

Obviously, the plurality of sub-data packets may also be transferred distributed in time and frequency. The distribution of the plurality of sub-data packets in time and frequency may be carried out according to a time and frequency hopping pattern. A time and frequency hopping pattern may be the combination of a time hopping pattern and a frequency hopping pattern, i.e. a sequence of points in time of transmission or transmission time intervals with which the sub-data packets are transferred, wherein transmission frequencies (or transmission frequency hops) are assigned to the points in time of transmission (or transmission time intervals).

In this case, a bandwidth of the occupancy of the frequency band indicated by the frequency hopping pattern may be significantly larger (e.g. at least by the factor 5 (or 10)) than a bandwidth of the reception filters of the receivers (receivers or transceivers) of the participants 106_1-106_n. To receive a telegram splitting-based data transfer, the respective participant may therefore be configured to switch, on the basis of the frequency hopping pattern (e.g. at the respective times or time slots indicated by the time hopping pattern), the reception frequency of its receiver to the respective frequencies or frequency channels of the frequency band indicated by the frequency hopping pattern so as to receive the plurality of sub-data packets.

FIG. 4 shows a schematic block circuit diagram of the base station 104 and one of the participants 106_1-106_n of the communication system 100 shown in FIG. 3, according to an embodiment of the present invention.

The participant 106_1 may comprise a transmitter (or a transmission module) 108_1, configured to transmit the uplink data transfer 120 to the base station 104. The transmitter 108_1 may be connected to an antenna 110_1 of the participant 106_1. Furthermore, the participant 106_1 may comprise a receiver (or a reception module) 112_1 configured to receive the downlink data transfer 122 from the base station 104. The receiver 112_1 may be connected to the antenna 110_1 or a further antenna of the participant 106_1. The participant 106_1 may also comprise a combined transmitter/receiver (e.g. transmission/reception module; transceiver).

The base station 104 may comprise a receiver (or reception module) 114 configured to receiver the uplink data transfer 120 from the participant 106_1. The receiver 114 may be connected to an antenna 116 of the base station 104. Furthermore, the base station 104 may comprise a transmitter (or transmission module) 118 configured to transmit the downlink data transfer 122 to the participant 106_1. The transmitter 118 may be connected to the antenna 116 or a further antenna of the base station 104. The base station 104 may also comprise a combined transmitter/receiver (or transmission/reception module; transceiver).

For example, the communication system 100 described with respect to FIGS. 3 and 4 may be a LPWAN (low power wide area network), as is defined in the standard ETSI TS 103 357 [4], for example.

Embodiments of a participant 106_1 and a base station 104 that may be exemplarily used in the communication system 100 described above with respect to FIGS. 3 and 4 are described in the following. Obviously, the subsequently described embodiments of the participant 106_1 and/or the base station 104 may also implemented in other communication systems with uncoordinatedly transmitting participants.

1. Signaling a Multicast Message in Non-Coordinated Networks

The embodiments described in the following enable implementing a multicast message (point-to-multipoint data transfer) from the base station 104 to the participants 106_1-106_n or part (real subset) of the participants 106_1-106_n in uncoordinated communication systems 100 in which the participants 106_1-106_n transfer data asynchronously to the base station 104.

Figure 5:
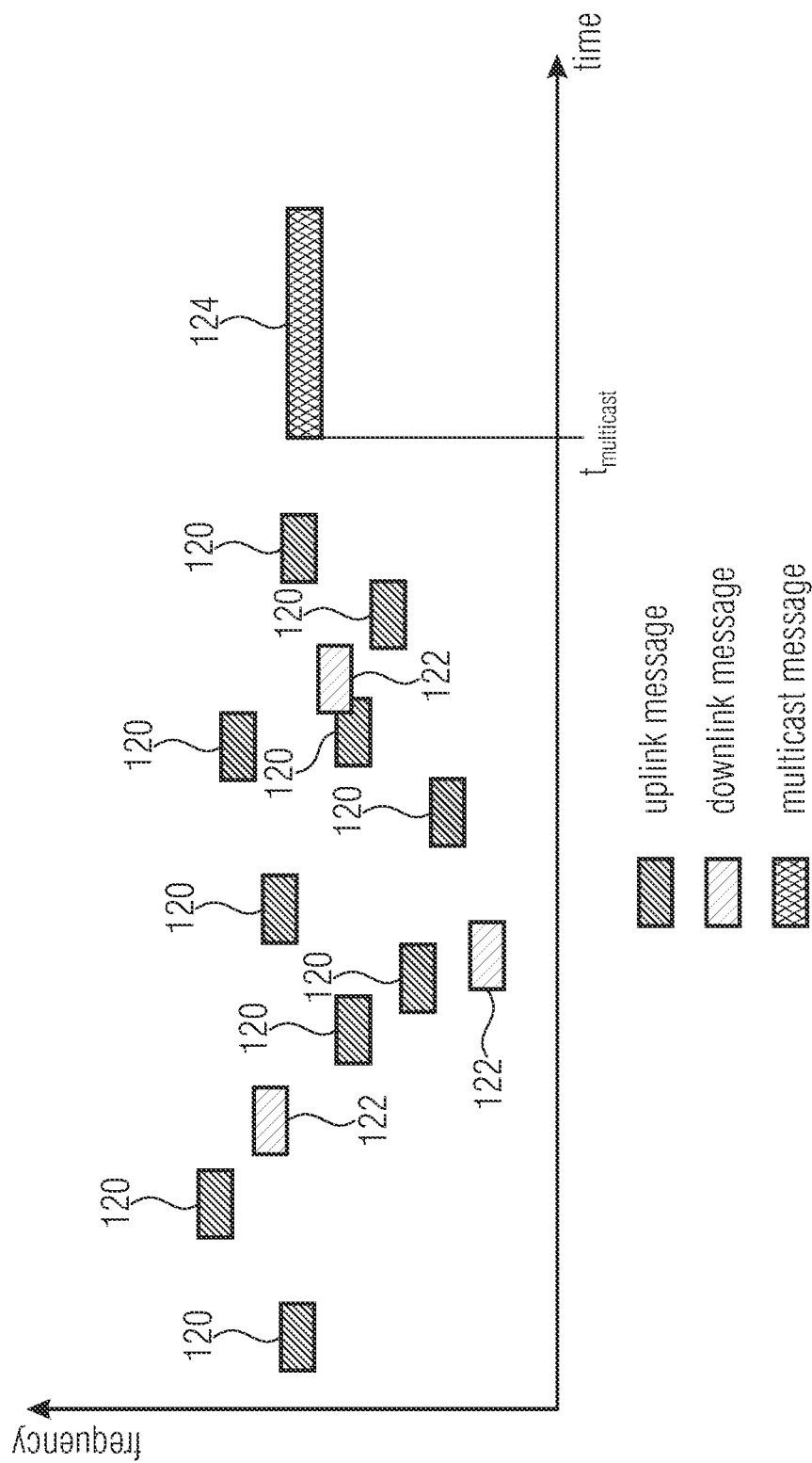
FIG. 5 shows, in a diagram, an occupancy of a frequency band of the communication system when performing several uplink data transfers and downlink data transfers between the base stations and several of the participants as well as a point-to-multipoint data transfer from the base station to several of the participants, according to an embodiment of the present invention.

For example, this could be implemented as shown in FIG. 5, wherein, during the emission of the multicast message (point-to-multipoint data transfer) 124, there are advantageously no other data transfers (e.g. overlapping/overlaying the point-to-multipoint data transfer 124) (e.g. uplink data transfers 120 and/or downlink data transfers 122).

In detail, FIG. 5 shows, in a diagram, an occupancy of a frequency band of the communication system 100 when performing several uplink data transfers 120 and downlink data transfers 122 between the base station 104 and several of the participants 106_1-106_n, and a point-to-multipoint data transfer 124 from the base station 104 to several of the participants 106_1-106_n, according to an embodiment of the present invention. In FIG. 5, the ordinate describes the frequency, and the abscissa describes the time. In other words, FIG. 5 shows an example of a multicast message (point-to-multipoint data transfer) 124 in an uncoordinated communication system.

For the participants 106_1-106_n, or a subset of the participants 106_1-106_n, of the communication system 100 to receive such a multicast message (point-to-multipoint data transfer) 124 according to FIG. 5, in embodiments, signaling of the point in time $t_{multicast}$ of the point-to-multipoint data transfer 124 or of other information based on which the participants 106_1-106_n may receive the point-to-multipoint data transfer 124 is carried out, as explained in the following.

Figure 6:
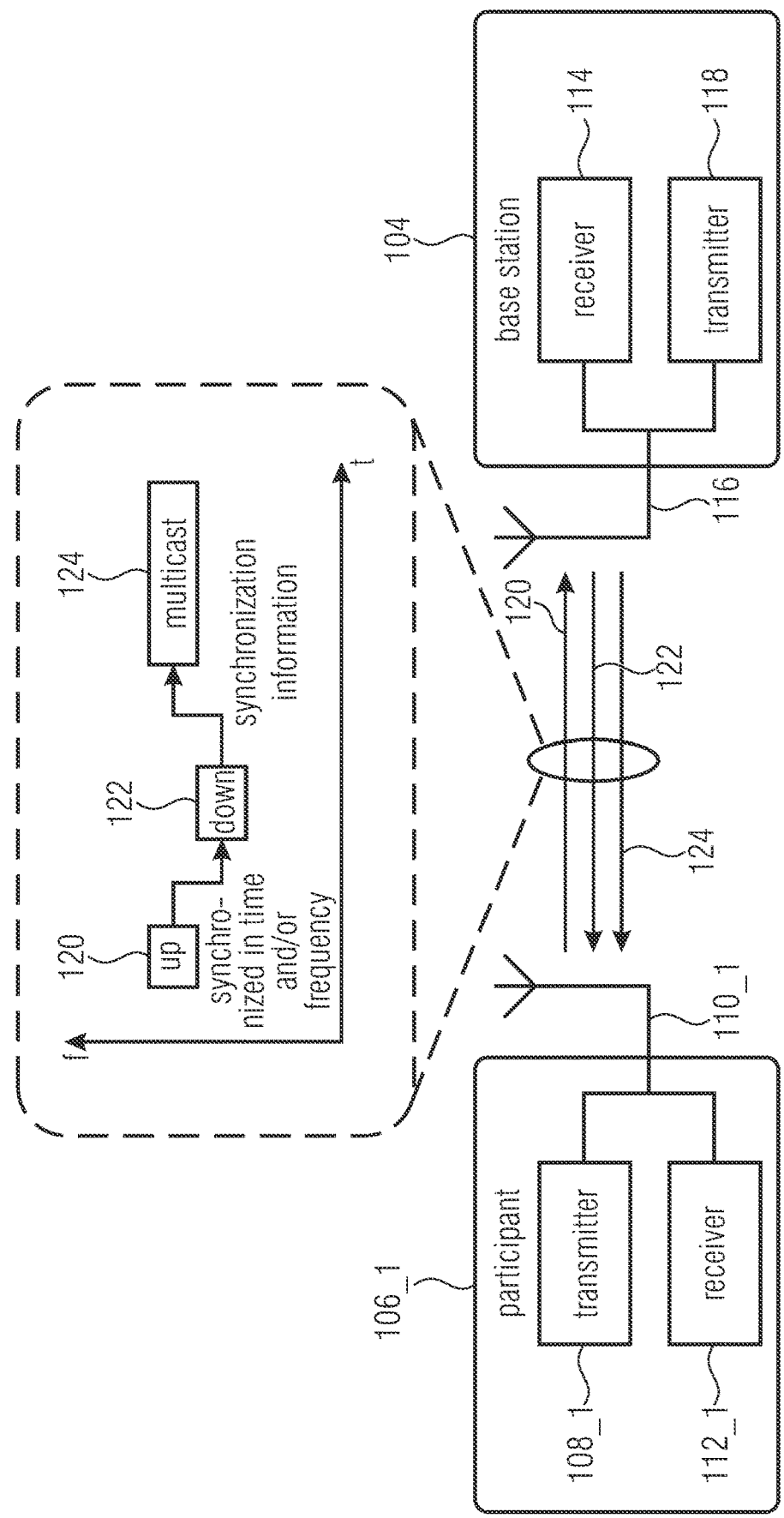
FIG. 6 shows a schematic block circuit diagram of a participant and a base station, according to an embodiment of the present invention.

FIG. 6 shows a schematic block circuit diagram of a participant 106_1 and a base station 104, according to an embodiment of the present invention.

The participant 106_1 (e.g. terminal point) may be configured to transmit data uncoordinatedly with respect to the base station 104 and/or other participants of the communication system 100 (cf. FIG. 3).

Furthermore, the participant 106_1 may be configured to transmit an uplink data transfer 120 to the base station 104, and to receive, temporally synchronized to the uplink data transfer 120, a downlink data transfer 122 from the base station 104, wherein the downlink data transfer 122 comprises signaling information, wherein the signaling information indicates, or signals, a subsequent point-to-multipoint data transfer 124 of the base station 104 and/or a further data transfer (e.g. a data transfer preparing the point-to-multipoint data transfer) preceding the point-to-multipoint data transfer 124.

Furthermore, the participant 106_1 may be configured to receive the point-to-multipoint data transfer (e.g. the multicast data transfer) 124 from the base station 104 on the basis of the signaling information.

The base station 104 may be configured to receive the uplink data transfer 120 from the participant 106_1 and to transmit, temporally synchronized to the received uplink data transfer 120, the downlink data transfer 122 to the participant 106_1, wherein the downlink data transfer 122 comprises the signaling information, wherein the signaling information indicates, or signals, the subsequent point-to-multipoint data transfer 124 of the base station 104 and/or the further data transfer (e.g. the data transfer preparing the point-to-multipoint data transfer) preceding the point-to-multipoint data transfer 124.

Furthermore, the base station 104 may be configured to transmit the point-to-multipoint data transfer 124 to the participant 160 (and to one or several other participants of the communication system 100, for example) according to the signaling information.

In embodiments, the signaling information may comprise information about a point in time of the point-to-multipoint data transfer 124. For example, the information about the point in time may be an absolute point in time, a relative point in time (e.g. a defined time span between the downlink data transfer 122 and the point-to-multipoint data transfer 124), or information from which the absolute or relative point in time may be derived, such as a number of clock cycles of a clock generator (oscillator) of the participant.

In embodiments, the signaling information may additionally or alternatively comprise information about a frequency or a frequency channel (e.g. of the frequency band used by the communication system) of the point-to-multipoint data transfer 124. For example, the information about the frequency may be an absolute frequency, or a relative frequency (e.g. an interval between a frequency of the downlink data transfer 122 and a frequency of the point-to-multipoint data transfer 124). For example, the information about the frequency channel may be an absolute frequency channel, or a relative frequency channel (e.g. a distance between a frequency channel of the downlink data transfer 120 and a frequency channel of the point-to-multipoint data transfer 124).

In embodiments, the point-to-multipoint data transfer 124 may comprise a plurality of sub-data packets transmitted distributed in time and frequency according to a time and/or frequency hopping pattern (telegram splitting transfer method). In this case, the signaling information may further comprise information about the time and/or frequency hopping pattern of the point-to-multipoint data transfer 124. For example, the point-to-multipoint data transfer 124 may be a telegram splitting-based data transfer. In a telegram splitting-based data transfer, the data to be transferred (e.g. (encoded) payload data of the physical layer) is divided onto a plurality of sub-data packets so that the plurality of sub-data packets each comprise only a part of the data to be transferred, wherein the plurality of sub-data packets is transferred not continuously, but distributed in time and/or frequency according to a time and/or frequency hopping pattern.

Detailed embodiments of the participant 106_1 and the base station 104 are described in more detail in the following.

1.1 Signaling in the Previous Downlink Packet

Beside messages targeted to several participants 106_1-106_n, the base station 104 typically also transfers individual information to the participants 106_1-106_n, e.g. an authenticated confirmation or a change of parameters of the respective participant. Since this is individual to each participant, an individual downlink has to be transferred.

This is where embodiments of the present invention come into place, by attaching the point in time of transmission of the following multicast message (point-to-multipoint data transfer) 124 to the individually transferred downlink message (downlink data transfer) 122.

If there are several frequency channels available, beside the signaling of the transmission time, the information about the transmission channel may also be added (e.g. signaled).

By this signaling, a participant now knows the point in time, and possibly the frequency channel, of the upcoming multicast message (point-to-multipoint data transfer) 124. With the help of the same method, further participants may also be synchronized to the multicast message (point-to-multipoint data transfer) 124.

If there is no individual data to be transmitted to the participant, only the point in time and, possibly, the frequency channel may be transferred in the upcoming downlink message (downlink data transfer) 124 in this case.

This method has the advantage that the point in time and, possibly, the frequency channel is only shared with the participants (the plurality of participants 106_1-106_n of the communication system 100) that are to receive the multicast message (point-to-multipoint data transfer) 124. Thus, for the participants that are not to receive the multicast message (point-to-multipoint data transfer) 124, there is no additional effort that increases the battery consumption.

Figure 7:
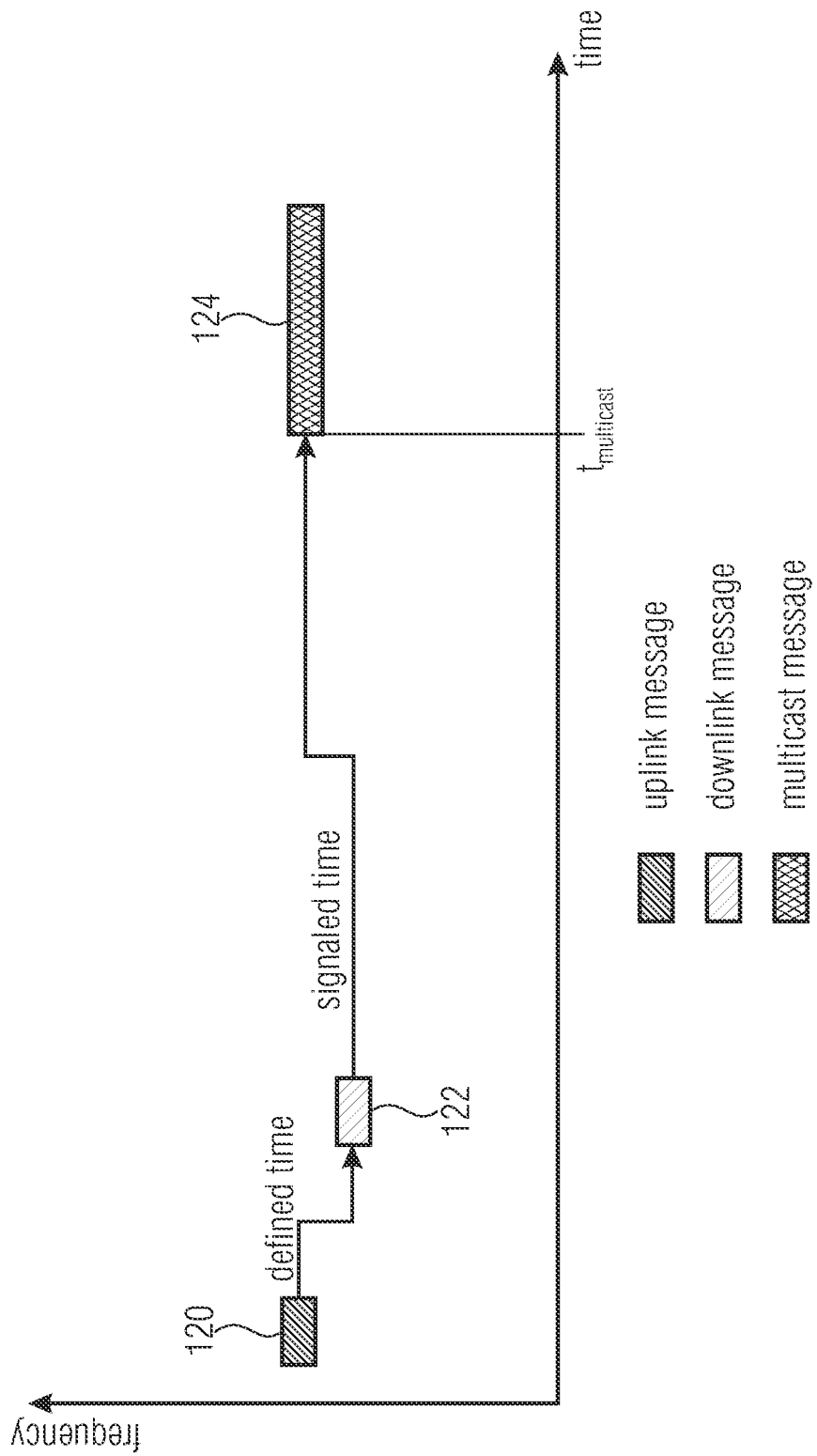
FIG. 7 shows, in a diagram, an occupancy of the frequency band of the communication system when performing an uplink data transfer, a downlink data transfer, and a point-to-multipoint data transfer, according to an embodiment of the present invention.

FIG. 7 exemplarily shows the process of the signaling of the multicast message (point-to-multipoint data transfer) 124 from the uplink message (uplink data transfer) 120 to the actual multicast message (point-to-multipoint data transfer) 124 for one participant of an uncoordinated radio network (communication system) 100.

In detail, FIG. 7 shows, in a diagram, an occupancy of the frequency band of the communication system 100 when performing an uplink data transfer 120, a downlink data transfer 122, and a point-to-multipoint data transfer 124, according to an embodiment of the present invention. In FIG. 7, the ordinate describes the frequency, and the abscissa describes the time.

As can be seen in FIG. 7, the downlink data transfer 122 takes place temporally synchronized to the uplink data transfer 120, e.g. after a specified (defined) time after the uplink data transfer 120. The downlink data transfer 122 comprises signaling information that indicates, or signals, the subsequent point-to-multipoint data transfer 124.

As indicated in FIG. 7, the signaling information may comprise information about a point in time of the point-to-multipoint data transfer 124, for example. Obviously, the signaling information may also additionally or alternatively comprise information about a frequency or a frequency channel of the point-to-multipoint data transfer 124.

In embodiments, if the point-to-multipoint data transfer 124 is transferred on the basis of the telegram splitting transfer method (TSMA, telegram splitting multiple access), the signaling information may comprise information about the time and/or frequency hopping pattern of the point-to-multipoint data transfer 124.

In other words, if TSMA is used for the transfer of the multicast message (point-to-multipoint data transfer) 124, the hopping pattern (time and/or frequency hopping pattern) may be signalized in addition if this has not been defined globally in advance.

In embodiments, the information about the point in time of transmission and/or transmission channel (transmission frequency) and/or the hopping pattern (only in TSMA) may be attached to an individually generated downlink data packet (e.g. the downlink data transfer 120) to a participant.

[4] defines a so-called authenticated wakeup message and/or authentication message in the downlink. With the help of this message, the base station 104 may transmit individually to a participant a confirmation of the preceding uplink message. If further individual data for the participant is available, the length of this data and the interval between the message and the following data is also signaled in this message. Now, if there is a signaling of a multicast message to a participant and there is no further individual data for the participant, the additional transfer may be used for the signaling of the multicast message, beside the wakeup message and authentication message.

In case of signaling a multicast message (point-to-multipoint data transfer) 124 only, the fields containing the additional information for the following data (length and time information, or PSI and TSI in [4]) may also be used for the direct signaling of the multicast message (point-to-multipoint data transfer) 124 (time, frequency, length, etc.). This reduces the overhead that would be required for the separate transfer beside the wakeup and authentication message.

In embodiments, in case of signaling a multicast message (point-to-multipoint data transfer) 124 only, available fields in a wakeup message and/or authentication message (downlink data transfer according to [4]) can be used to this end.

1.2 Rough Time Signaling

According to section 1.1, it often takes a long time until all necessary participants have been informed about the upcoming multicast message (point-to-multipoint data transfer) 124. Particularly in case of participants that have been informed about the upcoming multicast message (point-to-multipoint data transfer) 124 very early, a very large time difference has to be signaled. Being able to resolve this in an appropriately fine manner requires many bits to be transferred. In case of participants that are informed (temporally) very close to the actual multicast message (point-to-multipoint data transfer) 124, in the case of the same resolution, the upper spots of the bits of the data field are zero in the signaling.

From this follows that, depending on the (temporal) difference between the signaling and the multicast message (point-to-multipoint data transfer) 124, a sequence of different length would make sense for the signaling.

However, when considering a real participant that comprises a quartz, it becomes apparent that the inaccuracy of the point in time when the participant expects the multicast message (point-to-multipoint data transfer) 124 also depends on the time difference between the signaling and the multicast message (point-to-multipoint data transfer) 124.

The longer the difference, the more inaccurate is the point in time which the participant assumes for the multicast message (point-to-multipoint data transfer) 124. The more inaccurate this point in time, the larger the search range for the multicast message (point-to-multipoint data transfer) 124 that the participant selects. If the search range is significantly larger than the resolution of the transferred point in time of the multicast message (point-to-multipoint data transfer) 124, the resolution may be selected to be lower (thus more uncertainty), without drastically increasing the search range (in the worst case, the quartz error and the resolution error add up).

Typical values for inaccuracy in the signaling are in the range of 1 symbol (e.g. symbol durations) to ten 10,000 symbols (symbol durations).

Values higher than 10,000 symbols (e.g. symbol durations) have too large an inaccuracy and would require a very extensive post-synchronization.

In the case of ideal timings, it is important to note that the uncertainty is still large enough that a reception without post-synchronization would not be possible.

In embodiments, the resolution of the signaling may comprise a certain inaccuracy that may be determined in the context of the post-synchronization.

Instead of or in combination with the rough signaling of the point in time, a non-linear scaling of the point in time may be selected, e.g. a logarithmic scaling. This has the advantage that points in time close to the upcoming multicast message (point-to-multipoint data transfer) 124 have a more precise resolution than points in time still farther away. According to the above explanations, however, this is not critical since the inaccuracies increase as a (temporal) interval to the multicast message (point-to-multipoint data transfer) 124 increases due to quartz offsets (e.g. frequency offsets of the quartzes). Thus, the resolution may accordingly also become more inaccurate, the farther the point in time of the multicast message (point-to-multipoint data transfer) 124 is in the future.

In embodiments, the resolution of the signaling may comprise a non-linear scaling.

1.3 Signaling of a Further Uplink Message

For the signaling of the point in time of the multicast message (point-to-multipoint data transfer) 124 according to section 1.1 or section 1.2, e.g., one variable with 16 bits is typically transferred. In case of an exemplarily selected quantization of 1 s per LSB (Least Significant Bit), there is a maximum difference between the signaling and the multicast message (point-to-multipoint data transfer) 124 of 65536 seconds. This is approximately 18 hours.

Thus, it should be ensured that all required participants for the multicast message (point-to-multipoint data transfer) 124 can be informed within 18 hours before the message.

Typically, in large networks with several hundreds of thousands of participants (e.g. nodes) 106_1-106_n, this cannot be realized since there may be participants that transfer data to the base station 104 only once a day or even more infrequently. Thus, with the above-mentioned parameters, it is not possible to inform all participants (e.g. nodes) about the upcoming multicast message (point-to-multipoint data transfer) 124, or to signal the same to them.

Thus, in embodiments, instead of the point in time of the multicast message (point-to-multipoint data transfer) 124, an (approximate) time at which the participants should/have to transmit an uplink message (uplink data transfer) 120 to the base station 104 again may be shared with all participants informed about the multicast message (point-to-multipoint data transfer) 124 temporally before the maximum signaling length.

If this new uplink message (uplink data transfer) 120 is emitted by the participant, the base station 104 may in turn send back a downlink message (downlink data transfer) 122 and inform in the same about the point in time of the multicast message (point-to-multipoint data transfer) 124.

Figure 8:
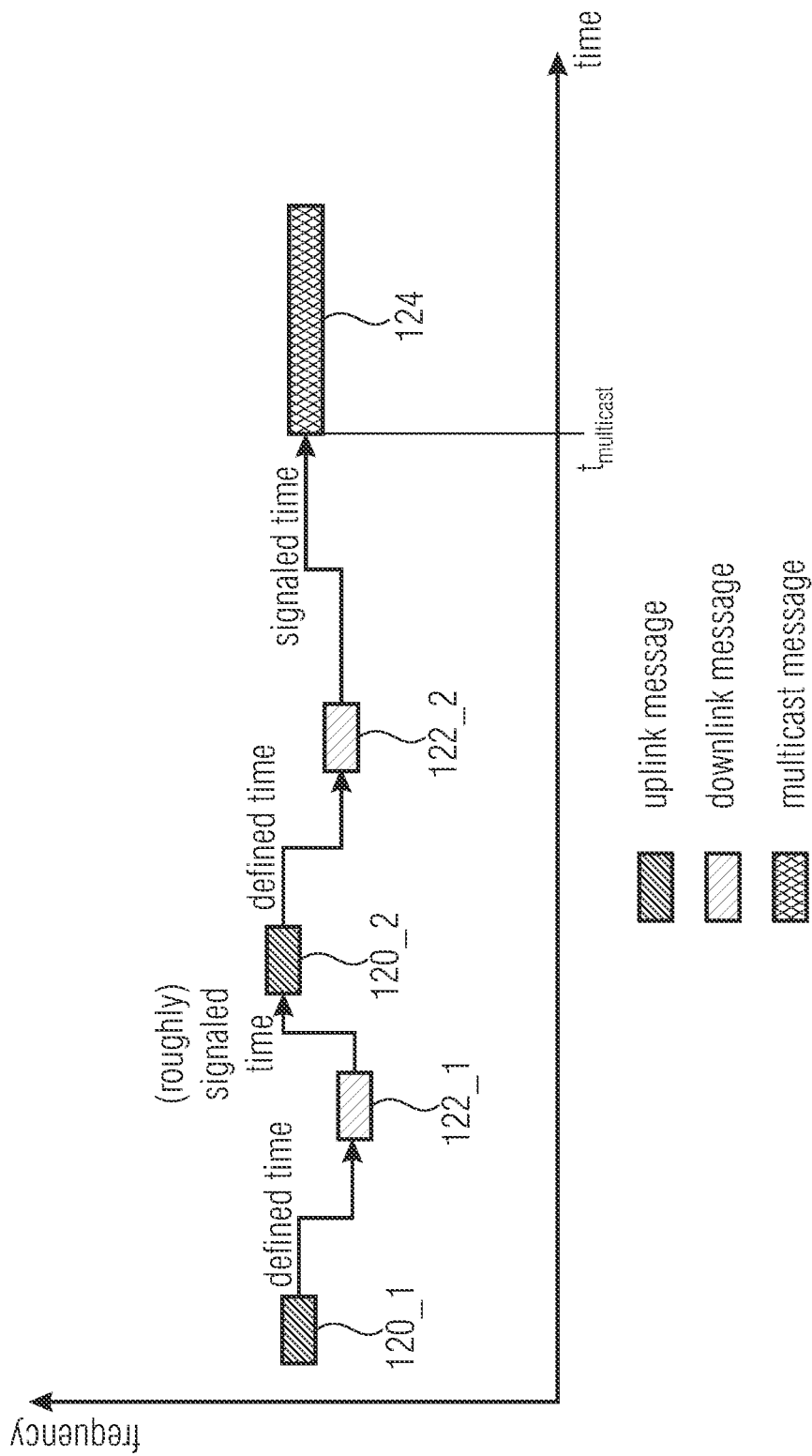
FIG. 8 shows, in a diagram, an occupancy of the frequency band of the communication system when performing a first uplink data transfer, a first downlink data transfer, a second uplink data transfer, a second downlink data transfer, as well as a point-to-multipoint data transfer, according to an embodiment of the present invention.

The temporal sequence of this schema is illustrated in FIG. 8. In this case, a (rough) time for a further uplink message (second uplink data transfer) 120_2 was transferred in the first downlink message (first downlink data transfer) 122_1. The information about the point in time and/or the frequency for the multicast message (point-to-multipoint data transfer) 124 then followed in the second downlink message (second downlink data transfer) 122_2.

In detail, FIG. 8 shows, in a diagram, an occupancy of the frequency band of the communication system 100 when performing a first uplink data transfer 120_1, a first downlink data transfer 122_1, a second uplink data transfer 120_1, and a second downlink data transfer 122_2, as well as a point-to-multipoint data transfer 124, according to an embodiment of the present invention. In FIG. 8, the ordinate describes a frequency, and the abscissa describes the time.

As can be seen in FIG. 8, the first downlink data transfer 122 takes place temporally synchronized to the first uplink data transfer 120_1, e.g. after a specified (defined) time after the first uplink data transfer 120_1. The first downlink data transfer 122 comprises first signaling information.

The first signaling information may indicate, or signal, a further data transfer (e.g. the data transfer preparing the point-to-multipoint data transfer) preceding the point-to-multipoint data transfer 124, wherein, in the embodiment shown in FIG. 8, the further data transfer may include both the second uplink data transfer 120_2 and the second downlink data transfer 122_2 following the same temporally synchronized.

As indicated in FIG. 8, the first signaling information may signal a timespan or point in time (e.g. a rough point in time) for the second uplink data transfer 120_2, wherein the second uplink data transfer 122_2 takes place in the time span, or at the rough point in time, signaled with the first signaling information, and wherein the second downlink data transfer 122_2 takes place temporally synchronized to the second uplink data transfer 120_2, e.g. after a specified (defined) after the first uplink data transfer 120_1. The second downlink data transfer 122_2 may comprise second signaling information, wherein the second signaling information indicate, or signal, the subsequent point-to-multipoint data transfer 124 of the base station 104.

For example, as indicated in FIG. 8, the second signaling information may comprise information about a point in time of the point-to-multipoint data transfer 124. Obviously, the second signaling information may additionally or alternatively also comprise information about a frequency or a frequency channel of the point-to-multipoint data transfer 124. If the point-to-multipoint data transfer 124 is transferred on the basis of the telegram splitting transfer method (TSMA, Telegram Splitting Multiple Access), the second signaling information may additionally or alternatively also comprise information about the time and/or frequency hopping pattern of the point-to-multipoint data transfer 124.

In other words, FIG. 8 shows a signaling of a time for a further uplink message (e.g. a second uplink data transfer) 120_2, wherein the further uplink message (e.g. the second uplink data transfer) 120_2 is followed by a further downlink message (e.g. a second downlink data transfer) 122_2 that defines a time for the multicast message (e.g. point-to-multipoint data transfer) 124, for example.

If a participant transmits messages to the base station 104 even more infrequently, e.g. only once per week, is also possible to request a further uplink message (uplink data transfer) multiple times as long as the required time for the signaling is within the valid range.

In embodiments, instead of the signaling of the point in time of the multicast message (point-to-multipoint data transfer), a (rough, approximate) time at which the participant should/has to send a further uplink message may be defined.

Due to the missing coordination of the communication system (radio network) 100, there may be interferences and failures in the transfer. The communication system 100 described herein is often operated in license-free bands in which the communication system 100 shares the resources with other communication systems (c.f. FIG. 3), wherein the communication system 100 and the other communication systems are mutually uncoordinated. Thus, there may also be interferences due to third-party communication systems.

With the telegram splitting transfer method, an approach that comprises a very high interference robustness has been developed, however, a maximum probability of getting through cannot be guaranteed.

If a participant has been informed about a further emission of an uplink message (uplink data transfer) according to section 1.3, the participant may expect a reliable answer of the base station 104 in the downlink (e.g. in the form of a downlink data transfer).

However, if the participant does not receive a downlink message (downlink data transfer) or a wrong/faulty/destroyed one, the participant knows that something in the transfer has not gone correctly (e.g. due to an interference in the channel).

In this case, the participant may promptly transmit a further uplink message (e.g. a third uplink data transfer) (e.g. a repetition of the previous uplink message (e.g. the second uplink data transfer 120_2)) to the base station 104. Then, it waits for the downlink message (e.g. the third downlink data transfer) of the base station 104 again. If this is received correctly again, it is ensured that the uplink message (e.g. the third uplink data transfer) has now correctly arrived at the base station 104. Otherwise, the participant may open a further reception window (e.g. for a further downlink data transfer) (if this is known to the base station 104) or carry out another emission of an uplink message (uplink data transfer).

In embodiments, if no correct answer in the downlink (e.g. in the form of a second downlink data transfer) has been obtained to the temporally (roughly) signaled further uplink message (e.g. the second uplink data transfer), a further uplink message (e.g. a third uplink data transfer) may be emitted (promptly).

Alternatively to signaling the multicast message (point-to-multipoint data transfer) 124, the point in time of the multicast message (point-to-multipoint data transfer) 124 may still be shared, however, with another resolution (e.g. a range of 1 minute to 1.5 months). The participant may then decide itself when (before the multicast message (point-to-multipoint data transfer) 124) it transmits an uplink message (e.g. a fourth uplink data transfer) again to obtain the more precise point in time (of the point-to-multipoint data transfer 124).

Through this, the participant may wait, e.g., up to 1 hour before the multicast message (point-to-multipoint data transfer) 124 whether an uplink message (uplink data transfer) is required anyway, and it thus obtains the precise point in time. If this is not the case, the participant may transmit a dedicated uplink message (e.g. the fourth uplink data transfer). In this case, the dedicated uplink message (e.g. the fourth uplink data transfer) should obviously be placed (pseudo-)randomly in the remaining time so that not all of the participants (e.g. nodes) not having a precise time synchronization for the multicast message (point-to-multipoint data transfer) 124 transmit at once.

In embodiments, in the case of participants that were informed long before the actual multicast message, the resolution may be selected to be larger in the signaling of the point in time. Then, for the time being, the participant may wait until shortly before the multicast message (point-to-multipoint data transfer) 124 whether there has been an uplink message (uplink data transfer). If this is not the case, a dedicated uplink message (e.g. the fourth uplink data transfer) may be triggered.

1.4 Signaling of the Time and/or the Frequency Channel of a Support Beacon

In embodiments, prior to the transfer of a multicast message (point-to-multipoint data transfer) 124, a so-called support beacon may be employed. Such a support beacon may contain a signaling until the next support beacon, or until the multicast message (point-to-multipoint data transfer) 124.

In embodiments, the participants (of the communication system 100) may be synchronized to this support beacon. In the same way as in section 1.1, e.g., the time until the support beacon and possibly the frequency channel of the support beacon used may be signaled, as is schematically indicated in FIG. 9.

Figure 9:
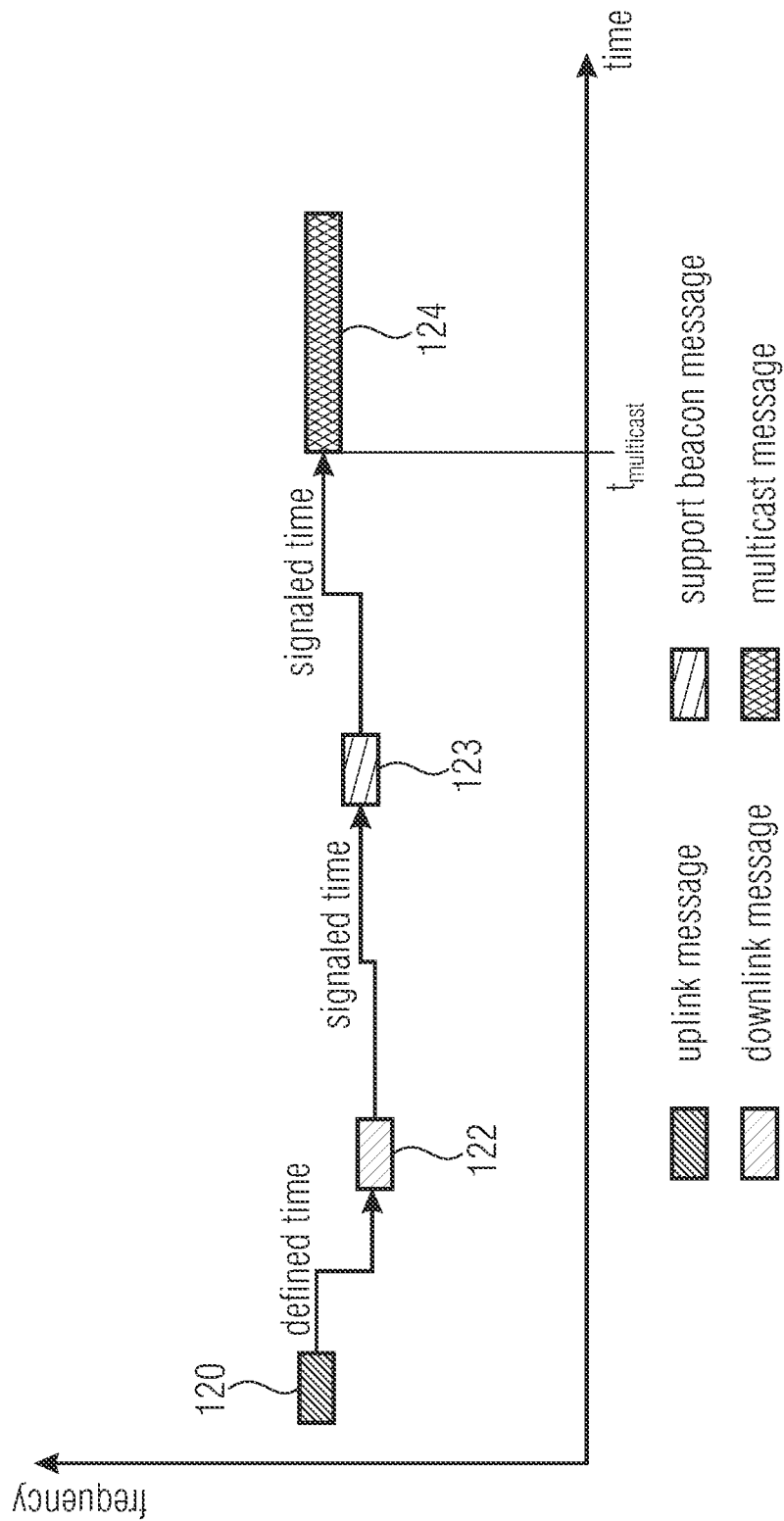
FIG. 9 shows, in a diagram, an occupancy of the frequency band of the communication system when performing an uplink data transfer, a downlink data transfer, a transfer of a support beacon as a further data transfer, and a point-to-multipoint data transfer, according to an embodiment of the present invention.

FIG. 9 shows, in a diagram, an occupancy of the frequency band of the communication system 100 when performing an uplink data transfer 120, a downlink data transfer 122, and a point-to-multipoint data transfer 124, according to an embodiment of the present invention. In FIG. 9, the ordinate describes the frequency, and the abscissa describes the time.

As can be seen in FIG. 9, the downlink data transfer 122 takes place temporally synchronized to the uplink data transfer 120, e.g. after a specified (defined) time after the uplink data transfer 120. The downlink data transfer 122 comprise first signaling information.

The first signaling information may indicate, or signal, a further data transfer (e.g. the data transfer preparing the point-to-multipoint data transfer) preceding the point-to-multipoint data transfer 124, wherein in the embodiment shown in FIG. 9, the further data transfer is a support beacon 123.

As is indicated in FIG. 9, the first signaling information may comprise information about a point in time of the support beacon 123. Obviously, the first signaling information may additionally or alternatively also comprise information about a frequency or a frequency channel of the support beacon. If the support beacon 123 is transferred on the basis of the telegram splitting transfer method (TSMA, Telegram Splitting Multiple Access), the first signaling information may additionally or alternatively also comprise information about the time and/or frequency hopping pattern of the support beacon 124.

The support beacon may comprise second signaling information, wherein the second signaling information indicates, or signals, a further support beacon or the subsequent point-to-multipoint data transfer 124 of the base station 104.

For example, as is indicated in FIG. 9, the second signaling information may comprise information about a point in time of the point-to-multipoint data transfer 124. Obviously, the second signaling information may additionally or alternatively also comprise information about a frequency or a frequency channel of the point-to-multipoint data transfer 124. If the point-to-multipoint data transfer 124 is transferred on the basis of the telegram splitting transfer method (TSMA, Telegram Splitting Multiple Access), the second signaling information may additionally or alternatively also comprise information about the time and/or frequency hopping pattern of the point-to-multipoint data transfer 124.

In other words, FIG. 9 shows a signaling of the time and possibly the frequency offset from a message of a participant (downlink data transfer 120) to a support beacon 123.

In embodiments, the information about the transmission time and/or transmission channel (transmission frequency) and/or hopping pattern (only in case of TSMA) of a support beacon may be added to an individually generated downlink data packet (e.g. a downlink data transfer 120) to a participant.

1.5 Compensation of Quartz Offsets

As already mentioned in section 1.2, the participants 106_1-106_n and the base station 104 usually have oscillation quartzes (e.g. as clock generators) for generating internal reference frequencies. However, these quartzes are not ideal and have so-called tolerances on the available frequencies. These tolerances are also transferred to the internal reference frequencies.

Among other things, the transmission frequency and the timer are fed from these reference frequencies, determining the time differences between the messages. Thus, the tolerances of the quartz directly affect the transfer and the reception of messages.

For example, the reception frequency of a participant is estimated in [4] from the uplink message (uplink data transfer), and the transmission frequency in the downlink is modified such that the participant may receive the downlink message (downlink data transfer) without a frequency offset. In other words, the characteristics of the downlink message (downlink data transfer) are adapted according to the frequency offset (of the quartz) of the participant such that the participant does no longer see the frequency offset of the quartz.

This schema works perfectly as a long as there is only communication between one base station 104 and one participant 106_1. If a base station 100 communicates with two or more participants 106_1-106_n, the base station 104 obtains for each one of the participants 106_1-106_n a different frequency offset generated by the respective quartz.

Thus, it is not possible to send a multicast message (point-to-multipoint data transfer) 124 to all participants 106_1-106_n in such a way that all participants 106_1-106_n do not see any or only a negligibly low frequency offset and/or time offset by their quartz.

Due to its admissible tolerances, each participant (e.g. node) has to carry out a time and frequency synchronization at the start of the multicast message (point-to-multipoint data transfer) 124.

Starting from a typical oscillation quartz with a tolerance range of 20 ppm and the maximum signaling length of approximately 18 hours, as exemplarily shown in section 1.3, there is a maximum temporal inaccuracy of the participant at the point in time of transfer of the multicast message (point-to-multipoint data transfer) 124 of 65536 s*20 ppm=1.31 s. Thus, for the correct point in time, the participant has to search through a search range of ±1.31 s before and after the expected point in time of the multicast message (point-to-multipoint data transfer) 124.

The same applies to the frequency offset, in case of a typical carrier frequency of 900 MHz, the maximum offset that has to be searched by the respective participant is ±18 kHz.

If the participant has fast processors for a search in real time, it may determine the correct point in time and the frequency offset without large storage requirements. However, if the search cannot be carried out in real time, all baseband data may alternatively be stored for a subsequent offline evaluation.

In the second case, the participants typically only have very small microprocessors on which a full storage of the baseband data is not possible with such large inaccuracies.

Consider the following example: the data rate of the multicast message (point-to-multipoint data transfer) 124 is 5 KHz. In case of the above-mentioned quartz offset of 20 ppm, the bandwidth to be searched is therefore 2*18 kHz+5 kHz=41 kHz. Thus, when using a SDR frontend in the baseband (I-phase and Q-phase), the sample rate is also at least 41 ksamples/s. Thus, in the above-mentioned search range of ±1.31 seconds, it has to be possible to buffer 107,420 samples in the memory for processing. With a typical ADC resolution of 16 bits (I-phase of 16 bits and Q-phase of 16 bits), this requires a random access memory of at least 429,680 kilobytes. Typical values for random access memories on small microprocessors are below 100 kilobytes (e.g. 64 kilobytes). Thus, offline processing of the entire search range cannot be carried out.

Both cases additionally require a very high computational effort, therefore significantly increasing the current consumption, which is particularly critical in battery-operated participants.

Thus, large search ranges both in the time direction and the frequency direction have to be avoided.

In some systems, the participants also have more than one quartz, e.g. a LF quartz (LF=low frequency) and a HF quartz (HF=high frequency). The LF quartz usually requires less current than the HF quartz. Thus, the LF quartz is usually operated continuously, and the timings are derived therefrom. However, the radio chip needs a higher clock, and is therefore operated with the HF quartz. Thus, the transmission frequency depends on the HF quartz. For reasons of the current consumption, the HF quartz can be turned off between the emissions.

The LF quartz typically has a higher tolerance than the HF quartz. For example, the LF quartz may have a tolerance of 100 ppm, whereas the HF quartz may have a tolerance of 20 ppm, for example.

As already mentioned, a measurement/estimation of the carrier frequency is carried out in [4]. The frequency offset may be determined with the help of the expected carrier frequency, and the quartz error may be determined therefrom. Alternatively or in combination with the estimation of the carrier frequency, it would also be possible to measure the time intervals (between two telegrams/packets/emissions or within one emission in the case of telegram splitting) so as to estimate the deviation of the quartz.

This offset, or these offsets, may also be transferred in the downlink (i.e. with the downlink data transfer) together with the parameters from the previous sections 1.1 to 1.4. As a result, the participant now knows its quartz offset at the point in time of the emission of the uplink message (uplink data transfer).

Alternatively, the average quartz offset from several previous uplink messages (uplink data transfers) may be used, and/or the temperature dependency could also be considered (informing about the temperature-normalized frequency deviation) if the temperature should be available.

When using the method of the quartz offset determination through the time offset, the accumulated offset (e.g. time offset) may also be determined. Here, the base station 104 knows the time between two arbitrary emissions (e.g. uplink data transfers) (i.e. not necessarily two successive emissions). Now, the base station 104 receives the two emissions (e.g. uplink data transfers) and determines the temporal deviation between the emissions (e.g. uplink data transfers). From this, the accumulated quartz offset (e.g. time offset) may be determined. Thus, the deviations of the quartz due to temperature deviations during the time between the two emissions (e.g. uplink data transfers) are therefore accumulated, since the quartz has to run continuously so as to determine the points in time of transmission, and the current environmental conditions therefore have an influence on the quartz.

The situation is different if the quartz offset is determined through the transmission frequency, since only the offset (e.g. frequency offset) at the current transmission point in time has an influence on the transmission frequency.

Typically, the environmental conditions at the respective participant do not change immediately, so that one can assume that, if the current quartz offset (e.g. frequency offset of the quartz) is known, the maximum error across the time between the signaling of the multicast message (point-to-multipoint data transfer) 124 and the actual emission (of the point-to-multipoint data transfer 124) is smaller than the maximum admissible quartz offset.

This reduces the search range both in the time direction and the frequency direction, therefore saving computational power, storage space and also energy. When selecting the same parameters as in the previous example, with the exception of the quartz offset in the respective participant having been corrected on the basis of the value from the previous uplink message (uplink data transfer) in this case, the maximum possible remaining offset (e.g. remaining frequency offset) is reduced to 5 ppm, for example.

Thus, the maximum search range in the time direction is reduced to 328 ms, or to 4.5 kHz in the frequency direction. Thus, only a quarter of the storage space is necessary, and the computational power is also reduced by this factor.

If more than one quartz is installed in the respective participants, the base station 104 may accordingly also determine the offset (e.g. frequency offset) for several quartzes, and signal the same (e.g. in the downlink data transfer). Alternatively, the quartzes may also be coupled in the participant (e.g. the node). As a result, (e.g. all of) the quartzes (of the respective participant) have the same offset (e.g. frequency offset). In this case, it is sufficient if the base station 104 estimates only the offset (e.g. frequency offset) of one quartz, since the respective participant may directly apply the offset to the other quartzes.

In embodiments, the quartz offset of the participant may be determined from the uplink message (uplink data transfer), and the participant may be informed about the same in the following downlink message (downlink data transfer). The participant may correct this offset and accordingly select smaller search windows when receiving the multicast message (point-to-multipoint data transfer).

Alternatively to signaling the quartz offset (e.g. frequency offset of the quartz) from the uplink (e.g. the uplink data transfer), the base station 104 may also use the quartz offset to adapt the signaled point in time of the multicast message (point-to-multipoint data transfer). To this end, the base station 104 may calculate the deviation of the point in time under consideration of the quartz offset of the participant (e.g. the terminal point) and accordingly signal the "wrong", or corrected, point in time. This similarly applies to the signaling of the frequency channel and, if applicable, of the hopping pattern in the case of telegram splitting.

Thus, the participant does not have to know anything about its quartz offset and may assume a smaller quartz error (see above) when searching for the start of the multicast message (point-to-multipoint data transfer).

In embodiments, the quartz offset (e.g. frequency offset of the quartz) of the participant may be considered when signaling the start time (e.g. of the point-to-multipoint data transfer 124) and may be modified in the base station 104 accordingly.

2. Further Embodiments

Figure 10:
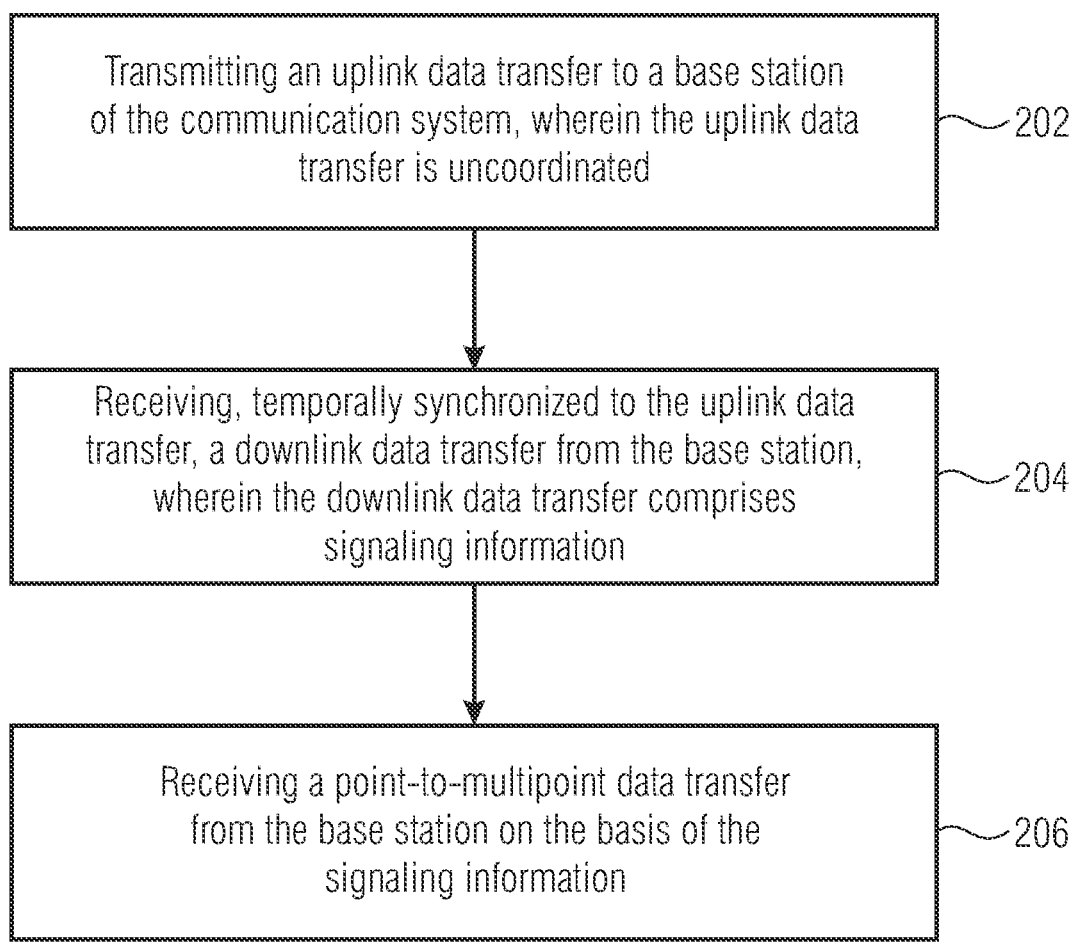
FIG. 10 shows a flow diagram of a method for operating a participant of a communication system, according to an embodiment of the present invention.

FIG. 10 shows a flow diagram of a method 200 for operating a participant of a communication system, according to an embodiment of the present invention. The method 200 includes a step 202 of transmitting an uplink data transfer to a base station of the communication system, wherein the uplink data transfer is uncoordinated. Furthermore, the method 200 includes a step 204 of receiving, temporally synchronized to the uplink data transfer, a downlink data transfer from the base station, wherein the downlink data transfer comprises signaling information. Furthermore, the method 200 includes a step 206 of receiving a point-to-multipoint data transfer from the base station on the basis of the signaling information.

Figure 11:
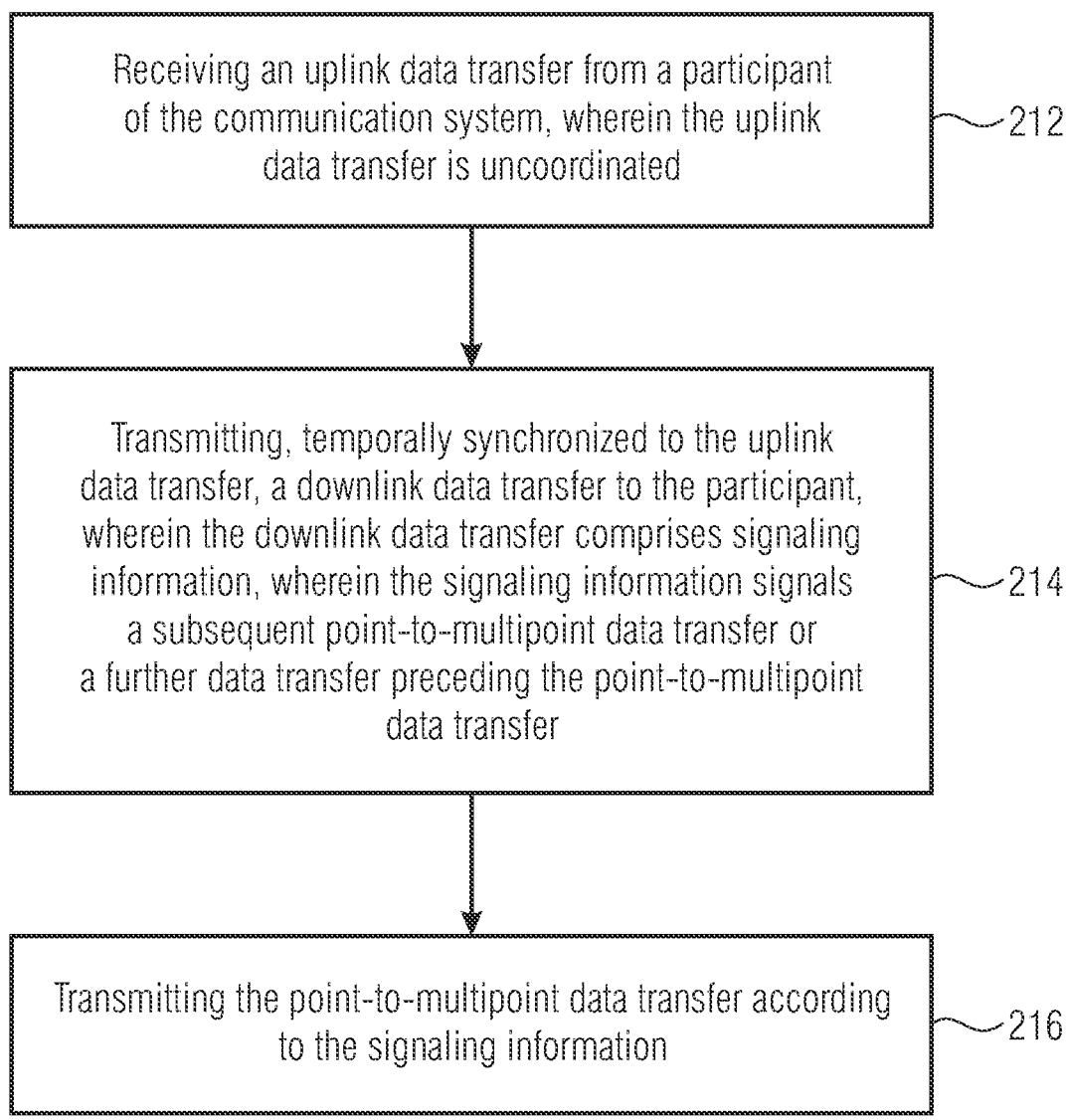
FIG. 11 shows a flow diagram of a method for operating a base station of a communication system, according to an embodiment of the present invention.

FIG. 11 shows a flow diagram of a method 210 for operating a base station of a communication system. The method 210 includes a step 212 of receiving an uplink data transfer from a participant of the communication system, wherein the uplink data transfer is uncoordinated. Furthermore, the method 210 includes a step 214 of transmitting, temporally synchronized to the uplink data transfer, a downlink data transfer to the participant, wherein the downlink data transfer comprises signaling information, wherein the signaling information signals a subsequent point-to-multipoint data transfer or a further data transfer preceding the point-to-multipoint data transfer. Furthermore, the method 210 includes a step 216 of transmitting the point-to-multipoint data transfer according to the signaling information.

Embodiments of the present invention concern a system (communication system) for the digital transfer of data via a radio transfer system. The data transmitted is typically transferred in several partial frequency channels of the overall available bandwidth.

Embodiments of the present invention may be used in so-called non-coordinated networks in which the radio participants transfer the data in an uncoordinated manner (without a previous allocation of a radio resource).

For example, embodiments of the present invention may be used in a communication system as defined in the ETSI TS 103 357 standard [4].

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium, or the recorded medium are typically tangible, or non-volatile.

A further embodiment of the inventive method thus is a data stream or a sequence of signals representing the computer program for performing any of the methods described herein. The data stream or the sequence of signals may be configured, for example, to be transmitted via a data communication link, for example via the internet.

A further embodiment includes a processing unit, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

For example, the apparatuses described herein may be implemented using a hardware device, or using a computer, or using a combination of a hardware device and a computer.

The apparatuses described herein, or any components of the apparatuses described herein, may at least be partially implement in hardware and/or software (computer program).

For example, the methods described herein may be implemented using a hardware device, or using a computer, or using a combination of a hardware device and a computer.

The methods described herein, or any components of the methods described herein, may at least be partially implement by performed and/or software (computer program).

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

BIBLIOGRAPHY

[1] G. Kilian, M. Breiling, H. H. Petkov, H. Lieske, F. Beer, J. Robert, and A. Neuberger, "Increasing Transmission Reliability for Telemetry Systems Using Telegram Splitting," IEEE Transactions on Communications, vol. 63, no. 3, pp. 949-961, March 2015.

[2] DE 10 2011 082 098 B1
[3] DE 10 2017 206 236 A1
[4] ETSI TS 103 357 Standard v1.1.1

The invention claimed is:

1. Terminal point of a communication system,
wherein the terminal point is configured to transmit an uplink data transfer to a base station of the communication system,
wherein a point in time of transmission of the uplink data transfer is determined by the terminal point itself,
wherein the terminal point is configured to receive, after a specified time after the uplink data transfer, a downlink data transfer from the base station in a specified time interval, wherein the downlink data transfer comprises signaling information,
wherein the terminal point is configured to receive a point-to-multipoint data transfer from the base station on the basis of the signaling information.

2. Terminal point according to claim 1,
wherein the signaling information comprises information about a point in time of the point-to-multipoint data transfer.

3. Terminal point according to claim 2,
wherein the signaling information further comprises information about a frequency channel of the point-to-multipoint data transfer.

4. Terminal point according to claim 1,
wherein the downlink data transfer further comprises clock generator correction information for correcting a clock deviation of a clock generator of the terminal point,
wherein the terminal point is configured to correct a clock deviation of the clock generator on the basis of the clock generator correction information.

5. Terminal point according to claim 1,
wherein the uplink data transfer is a first uplink data transfer, wherein the downlink data transfer is a first downlink data transfer, wherein the signaling information is first signaling information,
wherein the first signaling information signals a period of time or point in time for a second uplink data transfer,
wherein the terminal point is configured to transmit the second uplink data transfer to the base station in the signaled period of time and to receive, temporally synchronized to the second uplink data transfer, a second downlink data transfer from the base station, wherein the second downlink data transfer comprises second signaling information,
wherein the terminal point is configured to receive the point-to-multipoint data transfer on the basis of the second signaling information.

6. Terminal point according to claim 1,
wherein the signaling information is first signaling information,
wherein the first signaling information comprises information about a point in time of a support beacon,
wherein the terminal point is configured to receive the support beacon on the basis of the first signaling information, wherein the support beacon comprises fifth signaling information,
wherein the terminal point is configured to receive the point-to-multipoint data transfer on the basis of the fifth signaling information.

7. Terminal point according to claim 1,
wherein the terminal point is configured to transmit data asynchronously to other terminal points and/or the base station of the communication system.

8. Terminal point according to claim 1,
wherein the terminal point is configured to transmit the uplink data transfer to the base station at a random or pseudo-random point in time.

9. Terminal point according to claim 1,
wherein the uplink data transfer comprises a plurality of sub-data packets transferred distributed in time and/or frequency according to a time and/or frequency hopping pattern,
and/or wherein the downlink data transfer comprises a plurality of sub-data packets transferred distributed in time and/or frequency according to a time and/or frequency hopping pattern,
or wherein the signaling information comprises information about a point in time of the point-to-multipoint data transfer, wherein the point-to-multipoint data transfer comprises a plurality of sub-data packets transferred distributed in time and/or frequency according to a time and/or frequency hopping pattern, wherein the signaling information further comprises information about the time and/or frequency hopping pattern.

10. Terminal point according to claim 1,
wherein the terminal point is a sensor node or actuator node.

11. Terminal point according to claim 1,
wherein the terminal point is battery-operated, and/or
wherein the terminal point comprises an energy harvesting element for generating electric energy.

12. Base station of a communication system,
wherein the base station is configured to receive an uplink data transfer from a terminal point of the communication system, wherein a point in time of transmission of the uplink data transfer is determined by the terminal point itself,
wherein the base station is configured to transmit, after a specified time after the uplink data transfer, a downlink data transfer to the terminal point in a specified time interval, wherein the downlink data transfer comprises signaling information, wherein the signaling information signals a subsequent point-to-multipoint data transfer or a further data transfer preceding the point-to-multipoint data transfer,
wherein the base station is configured to transmit the point-to-multipoint data transfer according to the signaling information to a plurality of terminal points of the communication system, wherein the terminal point is part of the plurality of terminal points.

13. Base station according to claim 12,
wherein the signaling information comprises information about a point in time of the point-to-multipoint data transfer.

14. Base station according to claim 12,
wherein the base station is configured to determine a clock deviation of a clock generator of the terminal point on the basis of the uplink data transfer of the terminal point,
wherein the base station is configured to provide the downlink data transfer with clock generator correction information for correcting the clock deviation of the clock generator of the terminal point.

15. Base station according to claim 12,
wherein the uplink data transfer is a first uplink data transfer, wherein the downlink data transfer is a first downlink data transfer, wherein the signaling information is first signaling information, wherein the first signaling information signals a period of time or point in time for a second uplink data transfer, wherein the base station is configured to receive the second uplink data transfer from the terminal point in the signaled period of time and to transmit, temporally synchronized to the second uplink data transfer, a second downlink data transfer to the terminal point, wherein the second downlink data transfer comprises second signaling information, wherein the second signaling information signals the subsequent point-to-multipoint data transfer, wherein the base station is configured to transmit the point-to-multipoint data transfer according to the second signaling information.

16. Base station according to claim 12, wherein the signaling information is first signaling information, wherein the first signaling information comprises information about a point in time of a support beacon, wherein the base station is configured to transmit the support beacon according to the first signaling information, wherein the support beacon comprises fifth signaling information, wherein the fifth signaling information signals the subsequent point-to-multipoint data transfer.

17. Method for operating a terminal point of a communication system, the method comprising:

transmitting an uplink data transfer to a base station of the communication system, wherein a point in time of transmission of the uplink data transfer is determined by the terminal point itself, receiving, after a specified time after the uplink data transfer, a downlink data transfer from the base station in a specified time interval, wherein the downlink data transfer comprises signaling information, receiving a point-to-multipoint data transfer from the base station on the basis of the signaling information.

18. Method for operating a base station of a communication system, the method comprising:

receiving an uplink data transfer from a terminal point of the communication system, wherein a point in time of transmission of the uplink data transfer is determined by the terminal point itself, transmitting, after a specified time after the uplink data transfer, a downlink data transfer to the terminal point in a specified time interval, wherein the downlink data transfer comprises signaling information, wherein the signaling information signals a subsequent point-to-multipoint data transfer or a further data transfer preceding the point-to-multipoint data transfer, transmitting the point-to-multipoint data transfer according to the signaling information, to a plurality of terminal points of the communication system, wherein the terminal point is part of the plurality of terminal points.

19. Non-transitory digital storage medium having a computer program stored thereon to perform the method for operating a terminal point of a communication system, the method comprising:

transmitting an uplink data transfer to a base station of the communication system, wherein a point in time of transmission of the uplink data transfer is determined by the terminal point itself, receiving, after a specified time after the uplink data transfer, a downlink data transfer from the base station in a specified time interval, wherein the downlink data transfer comprises signaling information, receiving a point-to-multipoint data transfer from the base station on the basis of the signaling information, when said computer program is run by a computer.

20. Non-transitory digital storage medium having a computer program stored thereon to perform the method for operating a base station of a communication system, the method comprising:

receiving an uplink data transfer from a terminal point of the communication system, wherein a point in time of transmission of the uplink data transfer is determined by the terminal point itself, transmitting, after a specified time after the uplink data transfer, a downlink data transfer to the terminal point in a specified time interval, wherein the downlink data transfer comprises signaling information, wherein the signaling information signals a subsequent point-to-multipoint data transfer or a further data transfer preceding the point-to-multipoint data transfer, transmitting the point-to-multipoint data transfer according to the signaling information, to a plurality of terminal points of the communication system, wherein the terminal point is part of the plurality of terminal points, when said computer program is run by a computer.

* * * * *